US012581339B2

(12) United States Patent
Xie et al.

(10) Patent No.: US 12,581,339 B2
(45) Date of Patent: Mar. 17, 2026

(54) METHOD, APPARATUS, AND SYSTEM FOR RADIO LINK QUALITY MONITORING

(71) Applicant: HUAWEI TECHNOLOGIES CO., LTD., Shenzhen (CN)

(72) Inventors: Xi Xie, Beijing (CN); Junren Chang, Beijing (CN); Xiangdong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 480 days.

(21) Appl. No.: 17/898,955

(22) Filed: Aug. 30, 2022

(65) Prior Publication Data

US 2022/0417781 A1     Dec. 29, 2022

Related U.S. Application Data

(63) Continuation of application No. PCT/CN2021/077299, filed on Feb. 22, 2021.

(30) Foreign Application Priority Data

Mar. 4, 2020    (CN) .......................... 202010144096.4

(51) Int. Cl.
| | |
|---|---|
| *H04W 24/10* | (2009.01) |
| *H04W 24/08* | (2009.01) |
| *H04W 72/02* | (2009.01) |
| *H04W 72/542* | (2023.01) |

(52) U.S. Cl.
CPC ........... *H04W 24/10* (2013.01); *H04W 24/08* (2013.01); *H04W 72/02* (2013.01); *H04W 72/542* (2023.01)

(58) Field of Classification Search
CPC ..... H04W 24/08; H04W 24/10; H04W 72/02; H04W 72/54; H04W 72/542; H04W 72/543
See application file for complete search history.

(56) References Cited

U.S. PATENT DOCUMENTS

| | | | |
|---|---|---|---|
| 2013/0143550 A1* | 6/2013 | Ostrup | H04W 24/08 |
| | | | 455/424 |
| 2019/0081753 A1 | 3/2019 | Jung et al. | |

(Continued)

FOREIGN PATENT DOCUMENTS

| | | |
|---|---|---|
| CN | 1863363 A | 11/2006 |
| CN | 101072130 A | 11/2007 |

(Continued)

OTHER PUBLICATIONS

Huawei et al.,"Reducing RRM measurements for UE power saving", 3GPP TSG RAN WG1 Meeting #97, R1-1907520, Reno, USA, May 13-May 17, 2019, XP051728953, 8 pages.

(Continued)

*Primary Examiner* — Jeong S Park
(74) *Attorney, Agent, or Firm* — Maier & Maier, PLLC

(57) ABSTRACT

A measurement method, an apparatus, and a system. The method includes: a terminal device performs, based on a first measurement requirement, measurement for radio link connection quality monitoring; and if a trigger condition is met, the terminal device performs, based on a second measurement requirement, the measurement for radio link connection quality monitoring, where the second measurement requirement is obtained through relaxing based on the first measurement requirement. In this solution, the terminal device may determine whether the trigger condition is met. If the trigger condition is met, it indicates that a communication condition or a network environment of the terminal device is stable, or the terminal device has a low requirement for current communication quality. In this case, frequent measurement for radio link connection quality monitoring is equivalent to an unnecessary measurement process, and power consumption is high.

20 Claims, 4 Drawing Sheets

Network device

Terminal device

(56)        References Cited

U.S. PATENT DOCUMENTS

| | | | | |
|---|---|---|---|---|
| 2020/0029315 | A1* | 1/2020 | Lin | H04W 52/0216 |
| 2020/0252989 | A1* | 8/2020 | Chen | H04W 76/19 |
| 2020/0267690 | A1* | 8/2020 | Hsieh | H04W 76/28 |
| 2022/0131596 | A1* | 4/2022 | Sharma | H04W 72/542 |
| 2022/0232471 | A1* | 7/2022 | Laselva | H04W 24/08 |
| 2022/0322122 | A1* | 10/2022 | Fujimura | H04W 24/10 |
| 2023/0004864 | A1* | 1/2023 | Wang | H04W 24/04 |
| 2023/0078923 | A1* | 3/2023 | Shi | H04W 52/0258 |
| | | | | 370/311 |

FOREIGN PATENT DOCUMENTS

| | | | |
|---|---|---|---|
| CN | 108307686 | A | 7/2018 |
| CN | 108810967 | A | 11/2018 |
| CN | 110839254 | A | 2/2020 |

OTHER PUBLICATIONS

Huawei et al., "Power consumption reduction in RRM measurements" 3GPP TSG RAN WG1 Meeting #96, R1-1903430, R1-1903430, Athens, Greece, Feb. 25-Mar. 1, 2019, XP051601105, 25 pages.

"3rd Generation Partnership Project; Technical Specification Group Radio Access Network; NR; Study on User Equipment (UE) power saving in NR (Release 16)" #GPP TR 38.840, V16.0.0 (Jun. 2019), Technical Report, XP051754330, 74 pages.

Vivo., "UE Power Consumption Reduction in RRM Measurement", 3GPP TSG RAN WG1 #97, Reno, USA, May 13-May 17, 2019, XP051727628, 7 pages.

* cited by examiner

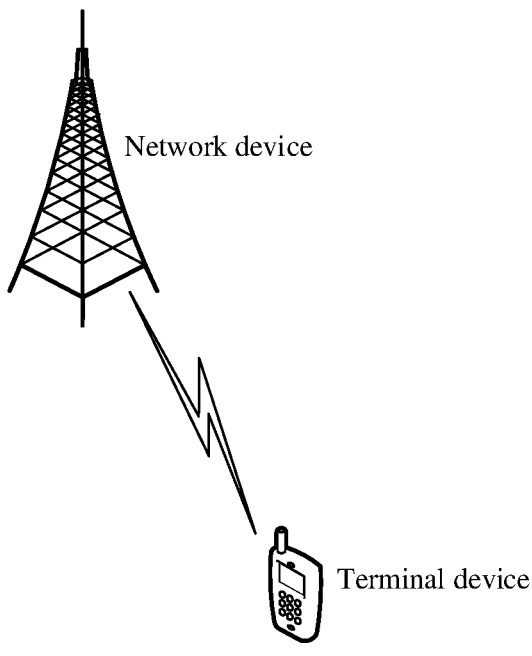

Network device

Terminal device

FIG. 1

201: A terminal device performs, based on a first measurement requirement, measurement for radio link connection quality monitoring 202: If a trigger condition is met, the terminal device performs, based on a second measurement requirement, the measurement for radio link connection quality monitoring

FIG. 2

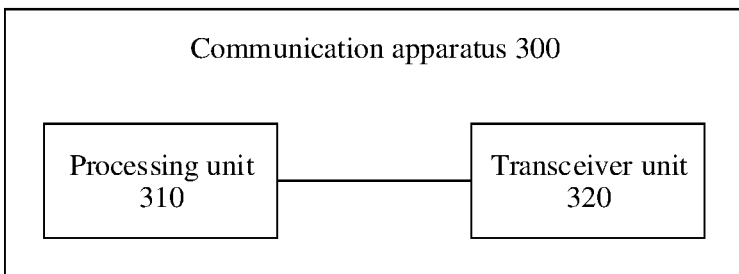

Communication apparatus 300

Processing unit 310

Transceiver unit 320

FIG. 3

Communication apparatus 400

Processing unit
410

Transceiver unit
420

Antenna

510

Radio frequency circuit

520

Memory

Processor

Input/Output apparatus

METHOD, APPARATUS, AND SYSTEM FOR RADIO LINK QUALITY MONITORING

CROSS-REFERENCE TO RELATED APPLICATIONS

This application is a continuation of International Application No. PCT/CN2021/077299, filed on Feb. 22, 2021, which claims priority to Chinese Patent Application No. 202010144096.4, filed on Mar. 4, 2020. The disclosures of the aforementioned applications are hereby incorporated by reference in their entireties.

TECHNICAL FIELD

The embodiments relate to the field of communication technologies, a measurement method, an apparatus, and a system.

BACKGROUND

In a current communication system, a terminal device may establish a connection to one or more network devices (for example, a base station). To enable the terminal device to promptly learn radio link quality between the terminal device and a network device connected to the terminal device, the terminal device may perform radio link monitoring (RLM) on an active bandwidth part (active BWP) of a primary cell (PCell) in a radio resource control (RRC) connected (RRC_CONNECTED) state, and when a secondary cell group (SCG) is configured, performs radio link quality monitoring on an active BWP of a primary secondary cell (PSCell), to change a serving cell when quality of a current serving cell is not suitable. The terminal device may further perform beam failure detection (BFD) in the RRC_CONNECTED state, to recover or change a beam when beam quality is not suitable.

In a conventional technology, a network device configures monitoring resources used for RLM and BED for a terminal device, and the terminal device needs to continuously measure the monitoring resources based on a specified period. To ensure communication performance, the terminal device needs to continuously measure the monitoring resources at a high frequency. However, in a scenario in which a communication condition or a network environment of the terminal device is stable, communication channel quality fluctuates slightly, or in a scenario in which a current service requirement of the terminal device is not high, the terminal device has a low requirement for communication quality. Frequent monitoring resource measurement may cause unnecessary power consumption of the terminal device. Especially in a high frequency scenario, the network device may configure more monitoring resources to evaluate quality of a radio link or a beam, and the terminal device needs to monitor more resources. This may further increase power consumption.

SUMMARY

The embodiments may provide a measurement method, an apparatus, and a system, to reduce power consumption generated when a terminal device performs measurement for radio link connection quality monitoring.

According to a first aspect, an embodiment may provide a measurement method. The method includes: performing, based on a first measurement requirement, measurement for radio link connection quality monitoring; and if a trigger condition is met, performing, based on a second measurement requirement, the measurement for radio link connection quality monitoring, where the second measurement requirement is obtained through relaxing based on the first measurement requirement.

The measurement for radio link connection quality monitoring may include RLM and/or BFD.

The method may be performed by a communication apparatus. The communication apparatus may be a communication device or a communication apparatus that can support the communication device in implementing a function required by the method, for example, a chip. For example, the communication apparatus is a terminal device, a chip that is disposed in the terminal device and that is configured to implement a function of the terminal device, or another component that is configured to implement the function of the terminal device. In the following description process, an example in which the communication apparatus is a terminal device is used.

Based on the foregoing solution, the terminal device may determine whether the trigger condition is met. If the trigger condition is met, it indicates that a communication condition or a network environment of the terminal device is stable, or the terminal device has a low requirement for current communication quality. In this case, frequent measurement for radio link connection quality monitoring is equivalent to an unnecessary measurement process, and power consumption is high. Therefore, for the cases, the terminal device may relax the measurement for radio link connection quality monitoring, to reduce power consumption of the terminal device.

A quantity of monitoring resources corresponding to the second measurement requirement may be less than a quantity of monitoring resources corresponding to the first measurement requirement, or a measurement period corresponding to the second measurement requirement may be greater than a measurement period corresponding to the first measurement requirement.

Based on the foregoing solution, a quantity of monitoring resources measured by the terminal device may be reduced, or a quantity of measurement times in an entire measurement process may be reduced by extending a measurement period, to relax the measurement for radio link connection quality monitoring. Therefore, power consumption of the terminal device is reduced.

The trigger condition may include any one or more pieces of the following content: First indication information sent by a network device is received, where the first indication information indicates to perform, based on the second measurement requirement, the measurement for radio link connection quality monitoring;

a quality of service QoS parameter of a current service meets a threshold condition corresponding to the QoS parameter; or a currently established data radio bearer DRB includes a DRB of a preset type.

The QoS parameter of the current service may include one or more parameters.

If the QoS parameter of the current service includes one parameter, when the parameter meets a given threshold condition, for example, the parameter is a packet delay requirement parameter, and a packet delay requirement parameter of the current service is greater than or equal to a threshold TH1 of the packet delay requirement parameter, the terminal device determines that a QoS requirement of the current service is low, and may relax measurement on the RLM and/or the BFD.

If the QoS parameter of the current service includes a plurality of parameters, when the plurality of parameters all meet given threshold conditions that the plurality of parameter respectively correspond to, for example, a packet delay requirement parameter of the current service is greater than or equal to a threshold TH1 of the packet delay requirement parameter, and a packet error rate requirement parameter of the current service is greater than or equal to a threshold TH2 of the packet error rate requirement parameter, the terminal device determines that a QoS requirement of the current service is low, and may relax measurement on the RLM and/or the BFD. When any one of the plurality of parameters does not meet a given threshold condition that each of the plurality of parameters corresponds to, for example, a packet delay requirement parameter of the current service is less than a threshold TH1 of the packet delay requirement parameter, or a packet error rate requirement parameter of the current service is less than a threshold TH2 of the packet error rate requirement parameter, the terminal device determines that a QoS requirement of the current service is high, and does not allow relaxing of the measurement on the RLM and/or the BFD.

Based on the foregoing solution, the network device may indicate, in an explicit indication manner, the terminal device to relax the measurement for radio link connection quality monitoring, or the terminal device may implicitly determine, based on the QoS parameter of the current service or a DRB setup status, whether the measurement for radio link connection quality monitoring can be relaxed.

The performing, based on a second measurement requirement, the measurement for radio link connection quality monitoring may include: performing, on a resource that meets a preset condition in the monitoring resources corresponding to the first measurement requirement, the measurement for radio link connection quality monitoring. The preset condition includes any one of the following content:
  a resource whose quality is higher than a first quality threshold;
  N resources with highest quality, where N is a positive integer;
  a maximum of N resources whose quality is higher than the first quality threshold;
  a resource whose quality is lower than the first quality threshold;
  N resources with lowest quality; or
  a maximum of N resources whose quality is lower than the first quality threshold.

Based on the foregoing solution, a manner in which a quantity of monitoring resources monitored in a measurement process based on the second measurement requirement is less than a quantity of monitoring resources monitored in a measurement process based on the first measurement requirement is provided. For example, the resource that meets the preset condition in the monitoring resources corresponding to the first measurement requirement is performed the measurement for radio link connection quality monitoring, to reduce power consumption of the terminal device.

The method may further include: receiving the first quality threshold and/or a value of N from the network device.

The monitoring resources corresponding to the first measurement requirement may be divided into M groups of resources, and the method may further include: determining a part of monitoring resources from the M groups of resources in a first selection manner; and the performing, based on a second measurement requirement, the measurement for radio link connection quality monitoring includes:

performing, on the part of monitoring resources, the measurement for radio link connection quality monitoring. The first selection manner includes any one of the following content:
  selecting K resources from each group of resources, where K is a positive integer;
  selecting a specified quantity of resources from each group of resources, where the specified quantity is different in each group of resources;
  selecting L resources with highest quality from each group of resources, where L is a positive integer;
  selecting a specified quantity of resources with highest quality from each group of resources, where the specified quantity is different in each group of resources;
  selecting a resource whose quality is higher than a second quality threshold from each group of resources;
  selecting L resources with lowest quality from each group of resources, where L is a positive integer;
  selecting a specified quantity of resources with lowest quality from each group of resources, where the specified quantity is different in each group of resources; or
  selecting a resource whose quality is lower than the second quality threshold from each group of resources.

Based on the foregoing solution, another manner in which a quantity of monitoring resources monitored in a measurement process based on the second measurement requirement is less than a quantity of monitoring resources monitored in a measurement process based on the first measurement requirement is provided. For example, a part of the monitoring resources may be selected, in the first selection manner, from the monitoring resources corresponding to the first measurement requirement to be performed the measurement for radio link connection quality monitoring, to reduce power consumption of the terminal device.

The method may further include: receiving a value of K or a specified quantity corresponding to each of the M groups of resources from the network device.

The monitoring resources corresponding to the first measurement requirement may include a CSI-RS resource and/or an SSB resource.

The monitoring resources corresponding to the first measurement requirement may include a CSI-RS resource and/or an SSB resource; and the performing, based on a second measurement requirement, the measurement for radio link connection quality monitoring may include: performing, on the SSB resource in the monitoring resources corresponding to the first measurement requirement, the measurement for radio link connection quality monitoring; performing, on the SSB resource and a part of the CSI-RS resource in the monitoring resources corresponding to the first measurement requirement, the measurement for radio link connection quality monitoring; performing, on a part of the SSB resource in the monitoring resources corresponding to the first measurement requirement, the measurement for radio link connection quality monitoring; or performing, on a part of the CSI-RS resource in the monitoring resources corresponding to the first measurement requirement, the measurement for radio link connection quality monitoring.

Based on the foregoing solution, still another manner in which a quantity of monitoring resources monitored in a measurement process based on the second measurement requirement is less than a quantity of monitoring resources monitored in a measurement process based on the first measurement requirement is provided. For example, a part of the monitoring resources may be selected, based on a type of a resource, from the monitoring resources corresponding to the first measurement requirement to be performed the measurement for radio link connection quality monitoring, to reduce power consumption of the terminal device.

The method further include: when one or more of the following conditions are met, performing, based on the first measurement requirement, the measurement for radio link connection quality monitoring:

condition 1: second indication information sent by the network device is received, where the second indication information indicates to stop, based on the second measurement requirement, the measurement for radio link connection quality monitoring;

condition 2: a measurement process corresponding to the second measurement requirement does not meet the trigger condition;

condition 3: quality of all resources monitored in a measurement process corresponding to the second measurement requirement is lower than a third quality threshold;

condition 4: a timer expires, and the timer is started when the measurement for radio link connection quality monitoring is started to be performed based on the second measurement requirement; and condition 5: a first time period in any relaxation cycle ends, where the first time period is a time period in which the measurement for radio link connection quality monitoring is performed based on the second measurement requirement.

Based on the foregoing solution, after relaxing the measurement for radio link connection quality monitoring, the terminal device may determine, by determining whether the foregoing one or more conditions are met, whether to stop relaxing the measurement for radio link connection quality monitoring. In this way, the terminal device can properly choose whether to relax the measurement for radio link connection quality monitoring.

The method may further include: receiving timing duration configured for the timer from the network device; or receiving the relaxation cycle and the first time period from the network device.

Based on the foregoing solution, the network device may configure, for the terminal device, duration to relax the measurement for radio link connection quality monitoring, or configure, for the terminal device, the relaxation cycle and a relaxation time period to relax the measurement for radio link connection quality monitoring.

The method may further include: receiving the first measurement requirement or the second measurement requirement sent by the network device.

According to a second aspect, an embodiment may provide a measurement method. The method includes: generating first indication information, where the first indication information indicates a terminal device to perform, based on a second measurement requirement, measurement for radio link connection quality monitoring, and the second measurement requirement is obtained through relaxing based on a first measurement requirement; and sending the first indication information to the terminal device.

The method may be performed by a communication apparatus. The communication apparatus may be a communication device or a communication apparatus that can support the communication device in implementing a function required by the method, for example, a chip. For example, the communication apparatus is a network device, a chip that is disposed in the network device and that is configured to implement a function of the network device, or another component that is configured to implement the function of the network device. In the following description process, an example in which the communication apparatus is a network device is used.

Based on the foregoing solution, the network device may indicate, by sending the indication information to the terminal device, the terminal device to relax the measurement for radio link connection quality monitoring, to reduce power consumption of the terminal device.

A quantity of monitoring resources corresponding to the second measurement requirement may be less than a quantity of monitoring resources corresponding to the first measurement requirement, or a measurement period corresponding to the second measurement requirement may be greater than a measurement period corresponding to the first measurement requirement.

The method may further include: The network device sends the first measurement requirement or the second measurement requirement to the terminal device.

A network device generating first indication information may include: the network device generates the first indication information when determining that any one of the following conditions is met:

condition 1: based on mobility status information of the terminal device, it is determined that the terminal device has low mobility, and/or based on moving speed information of the terminal device, it is determined that a moving speed of the terminal device is less than or equal to a first speed threshold;

condition 2: a quality of service QoS parameter of a current service meets a threshold condition corresponding to the QoS parameter; or condition 3: a currently established data radio bearer DRB includes a DRB of a preset type.

Based on the foregoing solution, when any one of the foregoing conditions is met, the network device may indicate, in an explicit indication manner, the terminal device to relax the measurement for radio link connection quality monitoring, to reduce power consumption of the terminal device.

The method may further include: The network device sends second indication information to the terminal device, where the second indication information indicates to stop, based on the second measurement requirement, the measurement for radio link connection quality monitoring.

Based on the foregoing solution, the network device may indicate, in an explicit indication manner, the terminal device to stop relaxing the measurement for radio link connection quality monitoring.

The method may further include: The network device generates the second indication information when determining that any one of the following conditions is met:

condition 1: based on the mobility status information of the terminal device, it is determined that the terminal device has high mobility, and/or based on the moving speed information of the terminal device, it is determined that the moving speed of the terminal device is greater than the first speed threshold; or condition 2: the quality of service QoS parameter of the current service does not meet the threshold condition corresponding to the QoS parameter.

Based on the foregoing solution, when any one of the foregoing conditions is met, the network device may indicate, in an explicit indication manner, the terminal device to stop relaxing the measurement for radio link connection quality monitoring.

The method may further include: The network device sends a first quality threshold and/or a quantity threshold N to the terminal device, where N is a positive integer; and the first quality threshold and/or N are/is used to determine a preset condition, and the preset condition is used to determine, from the monitoring resources corresponding to the first measurement requirement, a resource for the measurement for radio link connection quality monitoring. The preset condition includes any one of the following content:

a resource whose quality is higher than the first quality threshold;

N resources with highest quality;

a maximum of N resources whose quality is higher than the first quality threshold;

a resource whose quality is lower than the first quality threshold;

N resources with lowest quality; or a maximum of N resources whose quality is lower than the first quality threshold.

The method may further include: the network device sends, to the terminal device, M groups of information corresponding to M groups of resources into which the monitoring resources are divided, and a value of K or a specified quantity corresponding to each group, where the M groups of information, the value of K, or the specified quantity corresponding to each group is used to determine a first selection manner, and the first selection manner is used to select, from the monitoring resources corresponding to the first measurement requirement, a resource for the measurement for radio link connection quality monitoring. The first selection manner includes any one of the following content:

selecting K resources from each group of resources, where K is a positive integer;

selecting a specified quantity of resources from each group of resources, where the specified quantity is different in each group of resources;

selecting L resources with highest quality from each group of resources, where L is a positive integer;

selecting a specified quantity of resources with highest quality from each group of resources, where the specified quantity is different in each group of resources;

selecting a resource whose quality is higher than a second quality threshold from each group of resources;

selecting L resources with lowest quality from each group of resources, where L is a positive integer;

selecting a specified quantity of resources with lowest quality from each group of resources, where the specified quantity is different in each group of resources; or selecting a resource whose quality is lower than the second quality threshold from each group of resources.

The method may further include: the network device sends, to the terminal device, timing duration configured for a timer, where the timer is started when the measurement for radio link connection quality monitoring is started to be performed based on the second measurement requirement.

Based on the foregoing solution, the network device may configure, for the terminal device, duration to relax the measurement for radio link connection quality monitoring.

The method may further include: the network device sends, to the terminal device, a relaxation cycle and a first time period, where the first time period is a time period in which the measurement for radio link connection quality monitoring is performed based on the second measurement requirement in the relaxation cycle.

Based on the foregoing solution, the network device may configure, for the terminal device, the relaxation cycle and a relaxation time period to relax the measurement for radio link connection quality monitoring.

According to a third aspect, an embodiment may provide a communication apparatus. The apparatus may be a terminal device or may be a chip used in the terminal device. The apparatus has a function of implementing any one of the first aspect or the embodiments of the first aspect. The function may be implemented by hardware or may be implemented by hardware executing corresponding software. The hardware or the software includes one or more modules corresponding to the function. The communication apparatus may include a processing unit and a transceiver unit.

The processing unit may be configured to: perform, based on a first measurement requirement, measurement for radio link connection quality monitoring; and if a trigger condition is met, perform, based on a second measurement requirement, the measurement for radio link connection quality monitoring, where the second measurement requirement is obtained through relaxing based on the first measurement requirement.

A quantity of monitoring resources corresponding to the second measurement requirement may be less than a quantity of monitoring resources corresponding to the first measurement requirement, or a measurement period corresponding to the second measurement requirement may be greater than a measurement period corresponding to the first measurement requirement.

The trigger condition may include any one or more pieces of the following content:

First indication information sent by a network device is received, where the first indication information indicates to perform, based on the second measurement requirement, the measurement for radio link connection quality monitoring;

a quality of service QoS parameter of a current service meets a threshold condition corresponding to the QoS parameter; or a currently established data radio bearer DRB includes a DRB of a preset type.

The processing unit may be configured to perform, on a resource that meets a preset condition in the monitoring resources corresponding to the first measurement requirement, the measurement for radio link connection quality monitoring, where the preset condition includes any one of the following content:

a resource whose quality is higher than a first quality threshold;

N resources with highest quality, where N is a positive integer;

a maximum of N resources whose quality is higher than the first quality threshold;

a resource whose quality is lower than the first quality threshold;

N resources with lowest quality; or a maximum of N resources whose quality is lower than the first quality threshold.

The transceiver unit may be configured to receive the first quality threshold and/or a value of N from the network device.

The monitoring resources corresponding to the first measurement requirement may be divided into M groups of resources, and the processing unit may be further configured to: determine a part of monitoring resources from the M groups of resources in a first selection manner; and perform, on the part of monitoring resources, the measurement for radio link connection quality monitoring, where the first selection manner includes any one of the following content:

selecting K resources from each group of resources, where K is a positive integer;

selecting a specified quantity of resources from each group of resources, where the specified quantity is different in each group of resources;

selecting L resources with highest quality from each group of resources, where L is a positive integer;

selecting a specified quantity of resources with highest quality from each group of resources, where the specified quantity is different in each group of resources;

selecting a resource whose quality is higher than a second quality threshold from each group of resources;

selecting L resources with lowest quality from each group of resources, where L is a positive integer;

selecting a specified quantity of resources with lowest quality from each group of resources, where the specified quantity is different in each group of resources; or selecting a resource whose quality is lower than the second quality threshold from each group of resources.

The communication apparatus may further include a transceiver unit and may be further configured to receive a value of K or a specified quantity corresponding to each of the M groups of resources from the network device.

the monitoring resources corresponding to the first measurement requirement may include a CSI-RS resource and/or an SSB resource.

The processing unit may be configured to: perform, on the SSB resource in the monitoring resources corresponding to the first measurement requirement, the measurement for radio link connection quality monitoring; perform, on the SSB resource and a part of the CSI-RS resource in the monitoring resources corresponding to the first measurement requirement, the measurement for radio link connection quality monitoring; perform, on a part of the SSB resource in the monitoring resources corresponding to the first measurement requirement, the measurement for radio link connection quality monitoring; or perform, on a part of the CSI-RS resource in the monitoring resources corresponding to the first measurement requirement, the measurement for radio link connection quality monitoring.

The processing unit may be further configured to: when one or more of the following conditions are met, perform, based on the first measurement requirement, the measurement for radio link connection quality monitoring:

condition 1: second indication information sent by the network device is received, where the second indication information indicates to stop, based on the second measurement requirement, the measurement for radio link connection quality monitoring;

condition 2: a measurement process corresponding to the second measurement requirement does not meet the trigger condition;

condition 3: quality of all resources monitored in a measurement process corresponding to the second measurement requirement is lower than a third quality threshold;

condition 4: a timer expires, and the timer is started when the measurement for radio link connection quality monitoring is started to be performed based on the second measurement requirement; and condition 5: a first time period in any relaxation cycle ends, where the first time period is a time period in which the measurement for radio link connection quality monitoring is performed based on the second measurement requirement.

The transceiver unit may be further configured to: receive timing duration configured for the timer from the network device; or receive the relaxation cycle and the first time period from the network device.

The transceiver unit may be further configured to receive the first measurement requirement or the second measurement requirement sent by the network device.

According to a fourth aspect, an embodiment may provide a communication apparatus. The apparatus may be a network device or may be a chip used in the network device. The apparatus has a function of implementing any one of the second aspect or the embodiments of the second aspect. The function may be implemented by hardware or may be implemented by hardware executing corresponding software. The hardware or the software includes one or more modules corresponding to the function. The communication apparatus may include a processing unit and a transceiver unit.

The processing unit may be configured to generate first indication information, where the first indication information indicates a terminal device to perform, based on a second measurement requirement, measurement for radio link connection quality monitoring, and the second measurement requirement is obtained through relaxing based on a first measurement requirement; and the transceiver unit is configured to send the first indication information to the terminal device.

A quantity of monitoring resources corresponding to the second measurement requirement may be less than a quantity of monitoring resources corresponding to the first measurement requirement, or a measurement period corresponding to the second measurement requirement may be greater than a measurement period corresponding to the first measurement requirement.

The transceiver unit may be further configured to send the first measurement requirement or the second measurement requirement to the terminal device.

The processing unit may be configured to generate the first indication information when determining that any one of the following conditions is met:

condition 1: based on mobility status information of the terminal device, it is determined that the terminal device has low mobility, and/or based on moving speed information of the terminal device, it is determined that a moving speed of the terminal device is less than or equal to a first speed threshold;

condition 2: a quality of service (QoS) parameter of a current service meets a threshold condition corresponding to the QoS parameter; or condition 3: a currently established data radio bearer (DRB) includes a DRB of a preset type.

The transceiver unit may be further configured to send second indication information to the terminal device, where the second indication information indicates to stop, based on the second measurement requirement, the measurement for radio link connection quality monitoring.

The processing unit may be further configured to generate the second indication information when determining that any one of the following conditions is met:

condition 1: based on the mobility status information of the terminal device, it is determined that the terminal device has high mobility, and/or based on the moving speed information of the terminal device, it is determined that the moving speed of the terminal device is greater than the first speed threshold; or condition 2: the quality of service (QoS) parameter of the current service does not meet the threshold condition corresponding to the QoS parameter.

The transceiver unit may be further configured to send a first quality threshold and/or a quantity threshold N to the terminal device, where N is a positive integer; and the first quality threshold and/or N are/is used to determine a preset condition, and the preset condition is used to determine, from the monitoring resources corresponding to the first measurement requirement, a resource for the measurement for radio link connection quality monitoring.

The preset condition includes any one of the following content:

a resource whose quality is higher than a first quality threshold;

N resources with highest quality;

a maximum of N resources whose quality is higher than the first quality threshold;

a resource whose quality is lower than the first quality threshold;

N resources with lowest quality; or a maximum of N resources whose quality is lower than the first quality threshold.

The transceiver unit may be further configured to send, to the terminal device, M groups of information corresponding to M groups of resources into which the monitoring resources are divided, and a value of K or a specified quantity corresponding to each group, where the M groups of information, the value of K, or the specified quantity corresponding to each group is used to determine a first selection manner, and the first selection manner is used to select, from the monitoring resources corresponding to the first measurement requirement, a resource for the measurement for radio link connection quality monitoring, where the first selection manner includes any one of the following content:

selecting K resources from each group of resources, where K is a positive integer;

selecting a specified quantity of resources from each group of resources, where the specified quantity is different in each group of resources;

selecting L resources with highest quality from each group of resources, where L is a positive integer;

selecting a specified quantity of resources with highest quality from each group of resources, where the specified quantity is different in each group of resources;

selecting a resource whose quality is higher than a second quality threshold from each group of resources;

selecting L resources with lowest quality from each group of resources, where L is a positive integer;

selecting a specified quantity of resources with lowest quality from each group of resources, where the specified quantity is different in each group of resources; or selecting a resource whose quality is lower than the second quality threshold from each group of resources.

The transceiver unit may be further configured to send, to the terminal device, timing duration configured for a timer, where the timer is started when the measurement for radio link connection quality monitoring is started to be performed based on the second measurement requirement.

The transceiver unit may be further configured to send a relaxation cycle and a first time period to the terminal device, where the first time period is a time period in which the measurement for radio link connection quality monitoring is performed based on the second measurement requirement in the relaxation cycle.

According to a fifth aspect, an embodiment may provide a communication apparatus, including a processor and a memory. The memory is configured to store computer executable instructions. When the apparatus runs, the processor executes the computer executable instructions stored in the memory, to enable the apparatus to perform the method according to any one of the first aspect, the second aspect, or the embodiments of the first aspect and the second aspect.

According to a sixth aspect, an embodiment may provide a communication apparatus, including units or means configured to perform the steps according to any one of the first aspect and the second aspect or the embodiments of the first aspect and the second aspect.

According to a seventh aspect, an embodiment may provide a communication apparatus, including a processor and an interface circuit, where the processor is configured to: communicate with another apparatus by using the interface circuit, and perform the method according to any one of the first aspect, the second aspect, or the embodiments of the first aspect and the second aspect. There are one or more processors.

According to an eighth aspect, an embodiment may provide a communication apparatus, including a processor, configured to: connect to a memory; and invoke a program stored in the memory, to perform the method according to any one of the first aspect, the second aspect, or the embodiments of the first aspect and the second aspect. The memory may be located inside or outside the apparatus. In addition, there are one or more processors.

According to a ninth aspect, an embodiment may further provide a non-transitory computer-readable storage medium, where the non-transitory computer-readable storage medium stores instructions, and when the instructions are run on a computer, a processor is enabled to perform the method according to any one of the first aspect, the second aspect, or the embodiments of the first aspect and the second aspect.

According to a tenth aspect, an embodiment may further provide a computer program product including instructions, and when the computer program product runs on a computer, the computer is enabled to perform the method according to any one of the first aspect, the second aspect, or the embodiments of the first aspect and the second aspect.

According to an eleventh aspect, an embodiment may further provide a chip system, including a processor, configured to perform the method according to any one of the first aspect, the second aspect, or the embodiments of the first aspect and the second aspect.

According to a twelfth aspect, an embodiment may further provide a communication system, including a terminal device configured to perform the method according to any one of the first aspect or the embodiments of the first aspect, and a network device configured to perform the method according to any one of the second aspect or the embodiments of the second aspect.

For effects brought by any one of the third aspect to the twelfth aspect and the possible manners of the third aspect to the twelfth aspect, refer to effects brought by different manners of the method part in the embodiments. Details are not described herein again.

BRIEF DESCRIPTION OF THE DRAWINGS

FIG. 1 is a schematic diagram of an architecture of a communication system to which an embodiment is applicable;

FIG. 2 is a schematic flowchart of a measurement method according to an embodiment;

FIG. 3 is a schematic diagram of a communication apparatus according to an embodiment;

DETAILED DESCRIPTION OF THE EMBODIMENTS

Figures 4, 5:
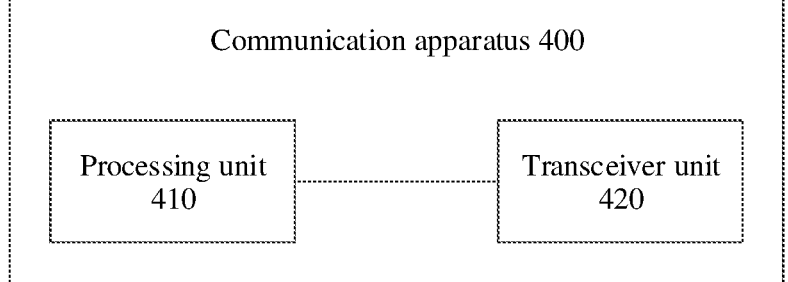
FIG. 4 is a schematic diagram of another communication apparatus according to an embodiment.
FIG. 5 is a schematic diagram of a terminal device according to an embodiment.

To make objectives, solutions, and advantages clearer, the following further describes the embodiments in detail with reference to the accompanying drawings. An operation method in a method embodiment may also be applied to an apparatus embodiment or a system embodiment.

The solutions provided in the embodiments may be applied to various communication systems, for example, a long term evolution (LTE) system, a 5th generation (5G) communication system, a 5G new radio (NR) system, a next generation mobile communication system, or another similar communication system, provided that there is an entity that can perform measurement based on a signal from another entity. This is not limited.

FIG. 1 is a schematic diagram of an architecture of a communication system to which an embodiment is applicable. The communication system includes a terminal device and a network device. The terminal device communicates with the network device by using a wireless interface.

The terminal device includes a device that provides voice and/or data connectivity for a user. The terminal device may include a device that provides voice for a user, a device that provides data connectivity for a user, or a device that provides voice and data connectivity for a user. For example, the terminal device may include a handheld device having a wireless connection function or a processing device connected to a wireless modem. The terminal device may communicate with a core network through a radio access network (RAN), and exchange voice or data with the RAN, or exchange voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an Internet of things (IoT) terminal device, light user equipment (UE), a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus. For example, the terminal device may include a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example, instead of a limitation, in the embodiments, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is more than a hardware device. The wearable device implements powerful functions through software support, data exchange, and cloud interaction. In a broad sense, wearable intelligent devices include full-featured and large-sized devices that can implement all or a part of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may all be considered as vehicle-mounted terminal devices. For example, the vehicle-mounted terminal device is also referred to as an on-board unit (OBU).

In the embodiments, the terminal device may further include a relay. Alternatively, it may be understood that any device that can perform data communication with a base station may be considered as a terminal device.

In the embodiments, an apparatus configured to implement a function of a terminal device may be a terminal device, or may be an apparatus, for example, a chip system, that can support the terminal device in implementing the function. The apparatus may be installed in the terminal device. In the embodiments, a chip system may include a chip, or may include a chip and another discrete component. In the solutions provided in the embodiments, the solutions provided in the embodiments are described by using an example in which an apparatus configured to implement a function of a terminal is a terminal device.

A network device includes, for example, an access network (AN) device such as a base station (for example, an access point), and may be a device that communicates with a wireless terminal device over an air interface through one or more cells in an access network. Alternatively, for example, a network device in a vehicle-to-everything (V2X) technology is a road side unit (RSU). The base station may be configured to mutually convert a received over-the-air frame and an IP packet and serve as a router between the terminal device and a remaining part of the access network, where the remaining part of the access network may include an IP network. The RSU may be a fixed infrastructure entity supporting a V2X application and may exchange messages with another entity supporting the V2X application. The network device may further coordinate attribute management of the air interface. For example, the network device may include an evolved NodeB (eNB) in a long term evolution (LTE) system or a long term evolution-advanced (LTE-A) system, may include a next generation NodeB (gNB) in a 5th generation (5G) mobile communication technology new radio (NR) system, or may include a centralized unit (CU) and a distributed unit (DU) in a cloud radio access network (Cloud RAN) system. This is not limited in the embodiments.

The network device may further include a core network device. The core network device includes, for example, an access and mobility management function (AMF), a user plane function (UPF), or the like.

Because the embodiments may relate to an access network device, the network device in the following is an access network device unless otherwise specified.

In the embodiments, an apparatus configured to implement a function of a network device may be a network device, or may be an apparatus, for example, a chip system, that can support the network device in implementing the function. The apparatus may be installed in the network device. In the solutions provided in the embodiments, the solutions provided in the embodiments are described by using an example in which an apparatus configured to implement a function of a network device is a network device.

For ease of understanding the embodiments, the following first describes some terms.

(1) An RRC connected state (also referred to as a connected state for short, where the "connected state" and the "RRC connected state" are a same concept, and the two names are interchangeable): A terminal device establishes an RRC connection to a network, to perform data transmission.

(2) A primary cell (PCell) is a cell in which a terminal device performs initial connection establishment, a cell in which a terminal device performs RRC connection reestablishment, or a primary cell designated in a handover process, and is responsible for RRC communication with the terminal device.

(3) Multi-radio dual connectivity (MR-DC) means that one terminal device uses resources provided by two nodes (or base stations) at the same time. In other words, the terminal device is connected to the two nodes at the same time. One node (or a base station) serves as a master node (MN), and the other node (or a base station) serves as a secondary node (SN). The MN is connected to the SN by using a network interface.

(4) A secondary cell group (SCG): A terminal device operating in an MR-DC mode is connected to two nodes (namely, an MN and the SN) at the same time, and each serving cell of the terminal device in the SN is referred to as an SCG.

(6) A primary secondary cell (PSCell) is a cell that is in an SCG and that is used by a terminal device to initiate initial random access.

(7) Radio link monitoring (RLM) means that a terminal device monitors cell-level radio link quality in an RRC connected state, and the RLM includes radio link quality monitoring on an active bandwidth part of a primary cell and radio link quality monitoring on active bandwidth parts of a primary cell and a secondary cell when a secondary cell group SCG is configured. The purpose of the RLM is to change a serving cell when quality of a current serving cell is not suitable. A basic mechanism of the RLM is that a network device configures, for a terminal device, a reference signal (namely, a monitoring resource) used for the RLM, and the terminal device continuously monitors monitoring resources used for the RLM and determines, based on a rule, whether a problem occurs. The reference signal used for the RLM may be a synchronization/physical broadcast channel block (SSB), a channel state information reference signal (CSI-RS), and/or the like.

The RLM involves operations at a physical layer and an RRC layer. The basic mechanism of the RLM is as follows.

For a physical layer operation: The network device configures, for the terminal device, a group of reference signals (namely, SSBs and/or CSI-RSs) used for the RLM by using an RLM configuration information element (Config IE), and the physical layer continuously measures and evaluates, based on a specified evaluation period, these monitoring resources used for the RLM. When quality of all of the monitoring resources used for the RLM is lower than a given threshold Qout, the physical layer sends an out-of-sync indication (out-of-sync indication) to the RRC layer; or when quality of a monitoring resource used for the RLM is higher than a given threshold Qin, the physical layer sends an in-sync indication (in-sync indication) to the RRC layer.

For an RRC layer operation: When the RRC layer receives consecutive out-of-sync indications with a given quantity threshold N310, the RRC layer considers that a radio link is faulty and starts a T310 timer. If the RRC layer receives consecutive in-sync indications with a given quantity threshold N311 while the T310 timer is running, the RRC layer considers that the radio link has recovered and stops the T310 timer. If the T310 timer expires, the RRC layer announces that a radio link failure (RLF) occurs.

(8) Beam failure detection (BFD) means that a terminal device monitors quality of a beam in an RRC connected state. The purpose of the BFD is to recover the beam and replace the beam when quality of the beam is not suitable. A basic mechanism of the BFD is that a network device configures, for a terminal device, a reference signal (namely, a monitoring resource) used for the BED, and the terminal device continuously monitors monitoring resources used for the BFD and determines, based on a rule, whether a problem occurs. A type of the monitoring resources used for the BFD may be an SSB resource and/or a CSI-RS resource.

The BFD involves operations at a physical layer and a MAC layer. The basic mechanism is as follows.

For a physical layer operation: The network device configures, for the terminal device, a group of reference signals (namely, SSBs and/or CSI-RSs) used for the BED by using an RLM configuration information element (Config IE), and the physical layer continuously measures and evaluates, based on a specified evaluation period, these monitoring resources used for the BFD. When quality of all of the monitoring resources used for the BFD is lower than a given threshold Qout, the physical layer sends a beam failure instance (BFI) indication to the MAC layer.

For a MAC layer operation: When receiving the BFI indication, the MAC layer considers that a beam problem occurs, starts or restarts a BFD timer, and accumulates a quantity of received BFIs. If an accumulated quantity of BFIs is greater than or equal to a given quantity threshold BFI maximum count, a beam failure recovery (BFR) process is triggered. If the BFD timer expires, the accumulated quantity of BFIs is cleared.

(9) "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in the embodiments are for distinguishing between a plurality of objects, and not intended to limit an order, a time sequence, priorities, or importance of the plurality of objects.

Currently, a process in which a terminal device performs measurement (for example, the RLM and/or the BFD) for radio link connection quality monitoring is always periodically performed. A network device allocates, to a terminal device, monitoring resources to be performed the measurement for radio link connection quality monitoring. The terminal device needs to continuously measure these monitoring resources based on a specified monitoring period, and determines, based on a measurement result of the monitoring resources, whether a problem occurs. To ensure communication performance of the terminal device, measurement periods of the RLM and the BFD are set to be short. After the network device configures, for the terminal device, monitoring resources used for the RLM or the BFD, the terminal device may need to measure these resources frequently to evaluate quality of a link or a beam. Consequently, such frequent measurement operations cause high power consumption of the terminal device. In addition, in a high frequency scenario, the network device usually configures, for the terminal device, more monitoring resources used for the RLM or the BFD. In other words, in addition to the foregoing problem of frequent measurement, the terminal device may further need to monitor more resources. This further increases power consumption of the terminal device.

To resolve the foregoing problem, the embodiments are provided. In this embodiment, the terminal device may determine whether a trigger condition is met. If the trigger condition is met, it indicates that the terminal device does not perform frequent measurement, and basic communication performance of the terminal device is also ensured. For example, in a scenario in which a communication condition or an environment of the terminal device is stable, communication channel quality fluctuates slightly, and measurement results obtained by the terminal device by monitoring resources used for the RLM and the BFD for several consecutive times may be similar. In this case, the terminal device actually does not need to measure the resources used for the RLM and the BFD very frequently. For another example, in a scenario in which a current service requirement of the terminal device is not high, the terminal device has a low requirement for communication quality, and the terminal device does not need to frequently measure the resources used for the RLM and the BFD. In this case, if all of the resources used for the RLM and/or the BFD configured by the network device still need to be measured based on a specified period according to a rule, it means that an unnecessary measurement process is performed, and power consumption is high. Therefore, for the cases, the terminal device may relax (or reduce) measurement on the RLM or the BFD, to reduce power consumption.

With reference to the accompanying drawings, the following describes methods provided in the embodiments.

Based on a network architecture shown in FIG. 1, an embodiment provides a measurement method. FIG. 2 is a flowchart of the method. On a terminal device side, the method may be performed by a terminal device or a component (such as a chip or a circuit) used in the terminal device. On a network side, the method may be performed by a network device or a component (such as a chip or a circuit) used in the network device. For ease of description, an example in which a terminal device and a network device perform the method is used below for description.

As shown in FIG. 2, the method includes the following steps.

Step 201: A terminal device performs, based on a first measurement requirement, measurement for radio link connection quality monitoring. The measurement for radio link connection quality monitoring may include the RLM and/or the BFD.

The first measurement requirement may be configured by the network device for the terminal device. The network device may send the first measurement requirement to the terminal device. Correspondingly, the terminal device receives the first measurement requirement sent by the network device. Alternatively, the first measurement requirement may be determined by the terminal device. Alternatively, the first measurement requirement may be specified in a protocol.

For example, the first measurement requirement may be a measurement requirement defined in the protocol. For example, all monitoring resources configured by the network device may be measured based on a measurement period. The first measurement requirement may also be another measurement requirement. This is not limited herein.

Step 202: If a trigger condition is met, the terminal device performs, based on a second measurement requirement, the measurement for radio link connection quality monitoring. The second measurement requirement is obtained through relaxing based on the first measurement requirement.

Herein, the trigger condition may include any one or more pieces of the following content.

In a first condition, first indication information sent by a network device is received, where the first indication information indicates to perform, based on the second measurement requirement, the measurement for radio link connection quality monitoring.

According to the first condition, the network device may indicate, in an explicit indication manner, the terminal device to relax the measurement on the RLM and/or the BFD.

In a second condition, a quality of service (QoS) parameter of a current service meets a threshold condition corresponding to the QoS parameter.

Each threshold in the threshold condition may be configured by the network device for the terminal device or may be determined by the terminal device.

The QoS parameter of the current service may include one or more parameters.

In an implementation, the QoS parameter of the current service includes one parameter. When the parameter meets a given threshold condition, the terminal device determines that a QoS requirement of the current service is low and may relax the measurement on the RLM and/or the BFD.

In an example, the parameter is a packet delay requirement (packet delay budget) parameter. It is assumed that a threshold of the packet delay requirement parameter is TH1, and if the packet delay requirement parameter of the current service of the terminal device is greater than or equal to TH1, it is considered that a QoS requirement of the service of the terminal device is low.

In another example, the parameter is a packet error rate requirement parameter. It is assumed that a threshold of the packet error rate requirement parameter is TH2, and if the packet error rate requirement parameter of a UE service is greater than or equal to TH2, it is considered that a QoS requirement of the service of the terminal device is low.

In another implementation, the QoS parameter of the current service includes a plurality of parameters. When the plurality of parameters meets given threshold conditions that the plurality of parameters respectively correspond to, the terminal device determines that a QoS requirement of the current service is low and may relax the measurement on the RLM and/or the BFD. When any one of the plurality of parameters does not meet a given threshold condition corresponding to the parameter, the terminal device determines that a QoS requirement of a current service is high and does not allow relaxing of the measurement on the RLM and/or the BFD.

In an example, the plurality of parameters are a packet delay requirement (packet delay budget) parameter and a packet error rate requirement parameter. It is assumed that a threshold of the packet delay requirement is TH1, and a threshold of the packet error rate (packet error rate) requirement is TH2.

If the packet delay requirement parameter of the current service of the terminal device is greater than or equal to TH1, and the packet error rate requirement parameter of the current service is greater than or equal to TH2, it is considered that a QoS requirement of the service of the terminal device is low.

If the packet delay requirement parameter of the current service of the terminal device is greater than or equal to TH1, and the packet error rate requirement parameter of the current service is smaller than TH2, it is considered that a QoS requirement of the service of the terminal device is high.

If the packet delay requirement parameter of the current service of the terminal device is smaller than TH1, and the packet error rate requirement parameter of the current service is greater than or equal to TH2, it is considered that a QoS requirement of the service of the terminal device is high.

If the packet delay requirement parameter of the current service of the terminal device is smaller than TH1, and the packet error rate requirement parameter of the current service is smaller than TH2, it is considered that a QoS requirement of the service of the terminal device is high.

According to the second condition, the terminal device may determine, based on a value of a quality of service (QoS) parameter of a current service, whether the measurement on the RLM and/or the BFD can be relaxed.

In a third condition, a currently established data radio bearer (DRB) includes a DRB of a preset type.

Generally, if a service needs to be transmitted between the network device and the terminal device, the DRB is established based on a QoS requirement of the service. Parameters configured for DRBs corresponding to different QoS requirements are also different. A QoS requirement of a current service may be determined based on a type of a currently established DRB. If the terminal device currently establishes one or more DRBs, it is considered that the terminal device determines that a QoS requirement of the current service is high, and the terminal device does not allow relaxing of the measurement on the RLM and/or the BFD. If the terminal device currently does not establish one or more DRBs, it is considered that the terminal device determines that a QoS requirement of the current service is low, and the terminal device does not allow relaxing of the measurement on the RLM and/or the BFD.

According to the third condition, whether the measurement on the RLM and/or the BFD can be relaxed may be implicitly determined based on an establishment status of the DRB.

The first condition, the second condition, and the third condition may be used together, and any one or more of the foregoing three conditions may also be used together with another trigger condition. When a plurality of trigger conditions exists, there may be a plurality of manners of determining whether the measurement on the RLM and/or the BFD can be relaxed. One manner is that, if a plurality of relaxation criteria is met, the measurement on the RLM and/or the BFD can be relaxed. Otherwise, if there is a relaxation criterion that is not met, relaxing of the measurement on the RLM and/or the BFD is not allowed. In another manner, a priority of the first condition (namely, a manner in which the network device indicates) is higher than a priority of another trigger condition. If the network device indicates that relaxing of the measurement on the RLM and/or the BFD is allowed, the terminal device may relax the measurement on the RLM and/or the BFD; or if the network device indicates that relaxing of the measurement on the RLM and/or the BFD is not allowed, the terminal device is not allowed to perform the measurement on the RLM and/or the BFD.

In the first condition, the first indication information may be generated by the network device and sent to the terminal device. In an implementation, the network device may generate the first indication information when determining that any one of the following three conditions is met.

Condition 1: The network device determines, based on mobility status information of the terminal device, that the terminal device has low mobility, and/or based on moving speed information of the terminal device, determines that a moving speed of the terminal device is less than or equal to a first speed threshold.

The mobility status information indicates a frequency of changing a serving cell of the terminal device. For example, when a quantity that the terminal device changes a serving cell within specified duration is greater than or equal to a preset first quantity threshold, the mobility status information of the terminal device is high mobility. When the quantity that the terminal device changes the serving cell within the specified duration is less than the preset first quantity threshold, and is greater than a preset second quantity threshold, the mobility status information of the terminal device is medium mobility. When the quantity that the terminal device changes the serving cell within the specified duration is less than or equal to the preset second quantity threshold, the mobility status information of the terminal device is low mobility. The moving speed information of the terminal device indicates the moving speed of the terminal device.

When the foregoing condition 1 is met, it indicates that the terminal device may be in a static state, move at a low speed, or move only within a range, communication channel quality of the terminal device fluctuates slightly, and a communication condition or environment of the terminal device is stable. In this case, the measurement on the RLM and/or the BFD can be relaxed, and basic communication performance of the terminal device is not affected, to reduce power consumption of the terminal.

Condition 2: A quality of service (QoS) parameter of a current service meets a threshold condition corresponding to the QoS parameter.

When determining that the condition 2 is met, the network device determines that the terminal device may be allowed to relax the measurement on the RLM and/or the BFD, and then sends the first indication information to the terminal device. For an implementation in which the quality of service QoS parameter of the current service meets the threshold condition corresponding to the QoS parameter, refer to the foregoing related description of the second item. Details are not described herein again.

Condition 3: A currently established data DRB includes a DRB of a preset type.

When determining that the condition 3 is met, the network device determines that the terminal device may be allowed to relax the measurement on the RLM and/or the BFD, and then sends the first indication information to the terminal device. For an implementation in which the currently established data radio bearer (DRB) includes the DRB of the preset type, refer to the related description of the third item. Details are not described herein again.

In this embodiment, the network device may indicate, in an explicit indication manner, the terminal device to relax the measurement for radio link connection quality monitoring, or the terminal device may implicitly determine, based on the QoS parameter of the current service or a DRB setup status, whether the measurement for radio link connection quality monitoring can be relaxed.

The trigger condition in step 202 is not limited to content including any one or more of the foregoing three conditions and may also include other content that may trigger relaxing of the measurement on the RLM and/or the BED.

In some other embodiments, the trigger condition may alternatively be an event trigger condition. For example, the network device may indicate a corresponding event in a configuration message, and when determining that these events are met, the terminal device triggers relaxing of the measurement for radio link connection quality monitoring.

It should be noted that the trigger condition may be considered as a relaxation criterion, namely, a determining mechanism in which the UE is allowed to relax the measurement on the RLM and/or the BFD. The terminal device considers relaxing the measurement on the RLM and/or the BFD only when the relaxation criterion is met. That the terminal device performs, based on the second measurement requirement, the measurement for radio link connection quality monitoring may be considered as a measurement relaxation manner. In other words, this may be considered as a behavior of relaxing the measurement on the RLM and/or the BFD by the terminal device, or how to relax the measurement on the RLM and/or the BFD. It should be understood that the relaxation criterion and the relaxation measurement manner may be separately used or may be used in combination.

The relaxation criterion and the relaxation measurement manner may be separately used, and there are two cases. In one case, the relaxation criterion in this embodiment is met, that is, the trigger condition including any one or more of the foregoing three conditions of content is met, the relaxation measurement manner may be triggered. In other words, the terminal device is triggered to perform, based on the second measurement requirement, the measurement for radio link connection quality monitoring. In the other case, if the relaxation criterion including other content is met, that is, a trigger condition including other content that may trigger relaxation of the measurement on the RLM and/or the BED is met, the relaxation measurement manner may also be triggered. In other words, the terminal device is triggered to perform, based on the second measurement requirement, the measurement for radio link connection quality monitoring. The relaxation measurement manner may be measuring fewer monitoring resources. Alternatively, the relaxation measurement manner may be measuring all monitoring resources configured by the network device by using an extended measurement period. Alternatively, the relaxation measurement manner may be another relaxation measurement manner. This is not limited herein.

The relaxation criterion and the relaxation measurement manner may be used in combination. In other words, the relaxation measurement manner in this embodiment may be triggered when the relaxation criterion in this embodiment is met. In other words, if the trigger condition including any one or more of the foregoing three conditions of content is met, the terminal device may be triggered to perform the measurement on the RLM and/or the BFD on fewer monitoring resources. Alternatively, the measurement on the RLM and/or the BFD may be performed, by using an extended measurement period, on all monitoring resources configured by the network device. In this way, the measurement on the RLM and/or the BFD can be relaxed.

In this embodiment, the second measurement requirement may be configured by the network device for the terminal device. The network device sends the second measurement requirement to the terminal device. Correspondingly, the terminal device receives the second measurement requirement sent by the network device. Alternatively, the second measurement requirement may be determined by the terminal device. Alternatively, the second measurement requirement may be specified in a protocol.

In this embodiment, the terminal device may determine whether the trigger condition is met. If the trigger condition is met, it indicates that a communication condition or a network environment of the terminal device is stable, or the terminal device has a low requirement for current communication quality. In this case, frequent measurement for radio link connection quality monitoring is equivalent to an unnecessary measurement process, and power consumption is high. Therefore, for the cases, the terminal device may relax the measurement for radio link connection quality monitoring, to reduce power consumption of the terminal device.

An implementation in which the second measurement requirement is obtained through relaxing based on the first measurement requirement is not limited in this embodiment.

In an example, a quantity of monitoring resources corresponding to the second measurement requirement is less than a quantity of monitoring resources corresponding to the first measurement requirement. A quantity of monitoring resources that need to be measured by the terminal device is reduced, so that the measurement on the RLM and/or the BFD is relaxed, to reduce power consumption of the terminal device.

In another example, a measurement period corresponding to the second measurement requirement is greater than a measurement period corresponding to the first measurement requirement. The terminal device may relax the measurement on the RLM and/or the BED by extending the measurement period. The extended measurement period in this embodiment may be relative to a measurement period specified by the measurement on the RLM and/or the BFD in a conventional solution. The measurement period is extended, so that a quantity of measurement times in an entire measurement process is reduced, to reduce power consumption of the terminal device.

The following describes several possible implementations of performing the measurement for radio link connection quality monitoring based on the second measurement requirement in the foregoing step 202 by using an example in which the measurement for radio link connection quality monitoring is relaxed by reducing a quantity of monitoring resources.

In a possible implementation, the terminal device may perform, on a resource that meets a preset condition in the monitoring resources corresponding to the first measurement requirement, the measurement for radio link connection quality monitoring.

The preset condition includes any one of the following content:

a resource whose quality is higher than a first quality threshold;
   N resources with highest quality, where N is a positive integer;
   a maximum of N resources whose quality is higher than the first quality threshold;
   a resource whose quality is lower than the first quality threshold;
   N resources with lowest quality; or
   a maximum of N resources whose quality is lower than the first quality threshold.

The first quality threshold and/or a value of N in the preset condition may be configured by the network device for the terminal device. In other words, the network device sends the first quality threshold and/or a quantity threshold N to the terminal device. Correspondingly, the terminal may receive the first quality threshold and/or the value of N from the network device, and determine the preset condition based on the first quality threshold and/or N. The preset condition is used to determine, from the monitoring resources corresponding to the first measurement requirement, a resource for the measurement for radio link connection quality monitoring.

According to this implementation, the resource that meets the preset condition is selected from the monitoring resources corresponding to the first measurement requirement, so that a manner in which a quantity of monitoring resources monitored in a measurement process based on the second measurement requirement is less than a quantity of monitoring resources monitored in a measurement process based on the first measurement requirement is implemented. Therefore, power consumption of the terminal device is reduced.

In another possible implementation, the network device may configure, for the terminal device, a specified quantity of selecting a part of monitoring resources, or the terminal device determines a quantity of selecting a part of monitoring resources.

For example, the network device may divide the monitoring resources corresponding to the first measurement requirement into, for example, M groups of resources, and send group information to the terminal device when configuring a monitoring resource for the terminal device. The group information may include M groups of information corresponding to the M groups of resources.

There may be a plurality of manners in which the terminal device selects a part of monitoring resources from the monitoring resources corresponding to the first measurement requirement, and the manners include but are not limited to the following several manners.

In a first manner, the network device may configure, for the terminal device, a quantity of monitoring resources selected from each group of resources. In this manner, the network device may send, to the terminal device, a value of a quantity K of monitoring resources selected from each group. Alternatively, the network device may specify, for the terminal device, different quantities of monitoring resources selected from each group. In this case, the network device sends, to the terminal device, a specified quantity corresponding to each group of resources. The value of K or the specified quantity corresponding to each group of resources may be sent with the group information or may be separately sent. Correspondingly, the terminal device may receive, from the network device, the value of K or the specified quantity corresponding to each group of resources in the M groups of resources and determine a first selection manner based on the M groups of information, the value of K, or the specified quantity corresponding to each group. The first selection manner is used to select, from the monitoring resources corresponding to the first measurement requirement, a resource for the measurement for radio link connection quality monitoring.

In a second manner, the terminal device may select several measurement resources with highest/lowest quality from each group.

In a third manner, the terminal device may select several measurement resources whose quality is higher than or lower than a given threshold from each group.

With reference to the foregoing three manners, in an example, the terminal device may determine a part of monitoring resources from the M groups of resources in the first selection manner, and then the terminal device performs, on the determined part of monitoring resources, the measurement for radio link connection quality monitoring.

The first selection manner includes any one of the following content:

selecting K resources from each group of resources, where K is a positive integer;
   selecting a specified quantity of resources from each group of resources, where the specified quantity is different in each group of resources;
   selecting L resources with highest quality from each group of resources, where L is a positive integer;
   selecting a specified quantity of resources with highest quality from each group of resources, where the specified quantity is different in each group of resources;
   selecting a resource whose quality is higher than a second quality threshold from each group of resources;
   selecting L resources with lowest quality from each group of resources, where L is a positive integer;
   selecting a specified quantity of resources with lowest quality from each group of resources, where the specified quantity is different in each group of resources; or
   selecting a resource whose quality is lower than the second quality threshold from each group of resources.

In this implementation, a part of the monitoring resources may be selected, in the first selection manner, from the monitoring resources corresponding to the first measurement requirement, so that a quantity of monitoring resources monitored in a measurement process based on the second measurement requirement is less than a quantity of monitoring resources monitored in a measurement process based on the first measurement requirement. Therefore, power consumption of the terminal device is reduced.

In this embodiment, the monitoring resources corresponding to the first measurement requirement may include a CSI-RS resource and/or an SSB resource.

In still another possible implementation, the terminal device may determine, based on a type of a monitoring resource, a part of monitoring resources from the monitoring resources corresponding to the first measurement requirement. The following provides several manners of determining the part of monitoring resources.

In a first manner, the terminal device may select the SSB resource in the monitoring resources corresponding to the first measurement requirement, to perform the measurement, and does not measure the CSI-RS resource.

In a second manner, the terminal device may select the CSI-RS resource in the monitoring resources corresponding to the first measurement requirement, to perform the measurement, and does not measure the SSB resource.

In a third manner, the terminal device may preferentially relax the measurement on the CSI-RS resource in the monitoring resources corresponding to the first measurement requirement. When the network device configures no CSI-RS resource for the terminal device, or when an additional condition is met, the terminal device considers relaxing the measurement on the SSB resource in the monitoring resources corresponding to the first measurement requirement. The additional condition may be that quality of the CSI-RS/the SSB resource monitored when the terminal device relaxes the measurement (that is, performs the measurement for radio link connection quality monitoring based on the second measurement requirement) is higher than a given threshold (in a given period of time).

In the third manner, a manner of relaxing measurement on the CSI-RS resource and/or the SSB resource in the monitoring resources corresponding to the first measurement requirement may be: reducing a quantity of CSI-RS resources/SSB resources that need to be measured or extending a measurement period of the CSI-RS resource/the SSB resource.

In the foregoing three manners, the SSB resource corresponds to a beam with a wide range, and the CSI-RS resource corresponds to a beam with a narrow range. Therefore, in the first manner and the third manner, the SSB resource is preferentially selected to be measured, and a signal status in a large range may be learned. In the second manner, the CSI-RS resource is selected for measurement, and a signal status in a small range may be learned.

In this embodiment, a part of monitoring resources may be selected from the monitoring resources corresponding to the first measurement requirement as the monitoring resources corresponding to the second measurement requirement, to achieve an objective of relaxing the measurement for radio link connection quality monitoring by reducing monitoring resources. In addition to that, a part of monitoring resources may also be selected from other monitoring resources than the monitoring resources corresponding to the first measurement requirement as the monitoring resources corresponding to the second measurement requirement. For example, before the measurement is relaxed, the measurement on the RLM and/or the BED is performed on five SSB resource blocks that are respectively numbered 1, 2, 3, 4, and 5. After the measurement is relaxed, the measurement on the RLM and/or the BFD is performed on two SSB resource blocks that are numbered 6 and 7.

With reference to any one or more of the foregoing three manners of determining the part of monitoring resources, that performing, based on a second measurement requirement, the measurement for radio link connection quality monitoring may be implemented in the following manner.

For example, the terminal device may perform, on the SSB resource in the monitoring resources corresponding to the first measurement requirement, the measurement for radio link connection quality monitoring.

For another example, the terminal device may perform, on the SSB resource and a part of the CSI-RS resource in the monitoring resources corresponding to the first measurement requirement, the measurement for radio link connection quality monitoring.

For another example, the terminal device may perform, on a part of the SSB resource in the monitoring resources corresponding to the first measurement requirement, the measurement for radio link connection quality monitoring For another example, the terminal device may perform, on a part of the CSI-RS resource in the monitoring resources corresponding to the first measurement requirement, the measurement for radio link connection quality monitoring.

In this implementation, a part of the monitoring resources may be selected, based on a type of a resource, from the monitoring resources corresponding to the first measurement requirement, so that a quantity of monitoring resources monitored in a measurement process based on the second measurement requirement is less than a quantity of monitoring resources monitored in a measurement process based on the first measurement requirement. Therefore, power consumption of the terminal device is reduced.

In some other embodiments, when one or more of the following conditions are met, the terminal device may perform, based on the first measurement requirement, the measurement for radio link connection quality monitoring.

Condition 1: The terminal device receives second indication information sent by the network device, where second indication information indicates to stop, based on the second measurement requirement, the measurement for radio link connection quality monitoring.

For example, in the process in which the terminal device performs, based on the second measurement requirement, the measurement for radio link connection quality monitoring, the network device sends the second indication information to the terminal device, and when receiving the second indication information, the terminal device stops relaxing the measurement on the RLM and/or the BFD.

The network device may generate the second indication information when determining that any one of the following conditions is met. In a first condition, the network device determines, based on the mobility status information of the terminal device, that the terminal device is in high mobility or medium mobility, and/or determines, based on the moving speed information of the terminal device, that the moving speed of the terminal device is greater than the first speed threshold. In a second condition, the quality of service QoS parameter of the current service does not meet the threshold condition corresponding to the QoS parameter.

Condition 2: A measurement process corresponding to the second measurement requirement does not meet the trigger condition. For content of the trigger condition, refer to the foregoing related content. Details are not described herein again.

In an example, in the process in which the terminal device performs, based on the first measurement requirement, the measurement for radio link connection quality monitoring, if the terminal device determines that the trigger condition is not met, the terminal device is not allowed to relax the measurement on the RLM and/or the BFD, and continues to perform, based on the first measurement requirement, the measurement for radio link connection quality monitoring.

In another example, in the process in which the terminal device performs, based on the second measurement requirement, the measurement for radio link connection quality monitoring, if the terminal device determines that the trigger condition is not met, the terminal device stops relaxing the measurement on the RLM and/or the BED.

Condition 3: Quality of all resources monitored in a measurement process corresponding to the second measurement requirement is lower than a third quality threshold. In a process in which the terminal device relaxes the measurement on the RLM and/or the BFD, if quality of all resources monitored by the terminal device is lower than the third quality threshold, the terminal device stops relaxing the measurement on the RLM and/or the BED, and performs, based on the first measurement requirement, the measurement for radio link connection quality monitoring.

Condition 4: A timer expires, and the timer is started when the measurement for radio link connection quality monitoring is started to be performed based on the second measurement requirement.

For example, the network device may configure the timer to control the terminal device to relax a measurement time of the measurement on the RLM and/or the BFD. The network device sends, to the terminal device, timing duration configured for the timer. When the terminal device starts to relax the measurement on the RLM and/or the BFD, the terminal device starts the timer. When the timer is running, the terminal device performs, based on the second measurement requirement, the measurement for radio link connection quality monitoring. When the timer expires, the terminal device stops relaxing the measurement on the RLM and/or the BFD, and performs, based on the first measurement requirement, the measurement for radio link connection quality monitoring.

Condition 5: A first time period in any relaxation cycle ends, where the first time period is a time period in which the measurement for radio link connection quality monitoring is performed based on the second measurement requirement.

For example, the network device may configure a relaxation cycle and the first time period for the terminal device. The network device sends the relaxation cycle and the first time period to the terminal device, so that the terminal device periodically relaxes the measurement on the RLM and/or the BFD. The terminal device receives the relaxation cycle and the first time period from the network device and relaxes the measurement on the RLM and/or the BFD in the first time period in each relaxation cycle. In other words, the terminal device performs, based on the second measurement requirement, the measurement on the RLM and/or the BFD in the first time period, and performs, based on the first measurement requirement, the measurement on the RLM and/or the BFD outside the first time period.

Based on the condition 5, the network device may control, by using a configuration parameter, the terminal device to relax the measurement on the RLM and/or the BFD.

According to this embodiment, after relaxing the measurement for radio link connection quality monitoring, the terminal device may determine, by determining whether the foregoing one or more conditions are met, whether to stop relaxing the measurement for radio link connection quality monitoring. In this way, the terminal device can properly choose whether to relax the measurement for radio link connection quality monitoring.

In this embodiment, on one hand, the relaxation criterion is provided to determine whether the terminal device relaxes the measurement on the RLM and/or the BFD. An implementation of the relaxation criterion is as follows: The network device may control the terminal device to relax the measurement on the RLM and/or the BFD. For example, the network device sends the first indication information to indicate the terminal device to relax the measurement on the RLM and/or the BFD or sends the second indication information to indicate the terminal device to stop relaxing the measurement on the RLM and/or the BED. The terminal device in an RRC connected state establishes a connection to the network device, so that the network device has a basic understanding of a status of the terminal device. In addition, the network device further learns an overall status of a system. Therefore, the network device can properly choose whether to relax the measurement on the RLM and/or the BFD, so that the terminal device may be allowed to relax the measurement on the RLM and/or the BFD to reduce power consumption. In addition, the network device can indicate, when necessary, the terminal device to stop relaxing the measurement on the RLM and/or the BFD to ensure a communication requirement. Another implementation of the relaxation criteria is that whether the measurement on the RLM and/or the BFD can be relaxed is determined by a service requirement of the terminal device. One of important basic operations of the terminal device in the RRC connected state is service transmission. That the terminal device relaxes the measurement on the RLM and/or the BFD cannot affect a basic communication function of the terminal device. Therefore, the service requirement is considered to determine whether the measurement on the RLM and/or the BFD can be relaxed. This can avoid a case in which the service transmission is affected because the terminal device does not monitor quality of a link/beam promptly due to relaxed measurement when transmitting a high-requirement service. Implementations of the relaxation criteria may be used separately, or may be used in combination, to ensure that the terminal device relaxes the measurement on the RLM and/or the BFD in a more proper case, so that basic communication of the terminal device is not adversely affected while power consumption of the terminal device is reduced.

On the other hand, the relaxation measurement manner is provided, that is, an implementation of relaxing the measurement on the RLM and/or the BFD. In an implementation, the network device configures a threshold to control resources on which the terminal device needs to perform the measurement on the RLM and/or the BFD. In another implementation, different manners of relaxing the measurement are used based on a type of a resource used for the RLM and/or the BFD. In the two manners of relaxing the measurement, the terminal device can relax the measurement on the RLM and/or the BFD by reducing a quantity of resources used for the RLM and/or the BFD on which the terminal device needs to perform the measurement. In addition, the network device may further configure a parameter to further control a relaxation behavior of the terminal device, to specify that the terminal device relaxes the measurement on the RLM and/or the BFD within a period of time, or periodically relaxes the measurement on the RLM and/or the BFD. This can ensure that the terminal device still has an overall control over quality of a link/beam and avoid a case in which a basic communication function is affected because the terminal device excessively relaxes the measurement on the RLM and/or the BFD.

The foregoing describes the solutions provided in the embodiments from a perspective of interaction between the network elements. It may be understood that, to implement the foregoing functions, each network element includes a corresponding hardware structure and/or software module for implementing each function. A person skilled in the art should easily be aware that, in combination with the units and algorithm steps in the examples described in the embodiments, the embodiments may be implemented by hardware or a combination of hardware and computer software. Whether a function is performed by hardware or hardware driven by computer software depends on particular applications and constraints of the solutions. A person skilled in the art may use different methods to implement the described functions for each particular application, but it should not be considered that the implementation goes beyond the scope of the embodiments.

It may be understood that in the foregoing method embodiments, corresponding steps or operations implemented by the terminal device may alternatively be implemented by a component (for example, a chip or a circuit) configured in the terminal device, and corresponding steps or operations implemented by the network device may alternatively be implemented by a component (for example, a chip or a circuit) configured in the network device.

An embodiment may further provide an apparatus configured to implement any one of the foregoing methods. For example, this embodiment provides an apparatus including units (or means) configured to implement steps performed by the terminal device in any one of the foregoing methods. For another example, another apparatus is further provided. The apparatus includes units (or means) configured to implement each step performed by the network device in any one of the foregoing methods.

FIG. 3 is a schematic diagram of a communication apparatus according to an embodiment. The apparatus is configured to implement each step performed by a corresponding terminal device in the foregoing method embodiment. As shown in FIG. 3, a communication apparatus 300 includes a processing unit 310.

The processing unit 310 is configured to: perform, based on a first measurement requirement, measurement for radio link connection quality monitoring; and if a trigger condition is met, perform, based on a second measurement requirement, the measurement for radio link connection quality monitoring, where the second measurement requirement is obtained through relaxing based on the first measurement requirement.

In a possible implementation, a quantity of monitoring resources corresponding to the second measurement requirement is less than a quantity of monitoring resources corresponding to the first measurement requirement, or a measurement period corresponding to the second measurement requirement is greater than a measurement period corresponding to the first measurement requirement.

In a possible implementation, the trigger condition includes any one or more pieces of the following content:

First indication information sent by a network device is received, where the first indication information indicates to perform, based on the second measurement requirement, the measurement for radio link connection quality monitoring;

a quality of service (QoS) parameter of a current service meets a threshold condition corresponding to the QoS parameter; or a currently established data radio bearer (DRB) includes a DRB of a preset type.

In a possible implementation, the processing unit 310 is configured to perform, on a resource that meets a preset condition in the monitoring resources corresponding to the first measurement requirement, the measurement for radio link connection quality monitoring, where the preset condition includes any one of the following content:

a resource whose quality is higher than a first quality threshold;

N resources with highest quality, where N is a positive integer;

a maximum of N resources whose quality is higher than the first quality threshold;

a resource whose quality is lower than the first quality threshold;

N resources with lowest quality; or a maximum of N resources whose quality is lower than the first quality threshold.

In a possible implementation, the apparatus 300 further includes a transceiver unit 320, configured to receive the first quality threshold and/or a value of N from the network device.

In a possible implementation, the monitoring resources corresponding to the first measurement requirement are divided into M groups of resources, and the processing unit 310 is further configured to: determine a part of monitoring resources from the M groups of resources in a first selection manner; and perform, on the part of monitoring resources, the measurement for radio link connection quality monitoring, where the first selection manner includes any one of the following content:

selecting K resources from each group of resources, where K is a positive integer;

selecting a specified quantity of resources from each group of resources, where the specified quantity is different in each group of resources;

selecting L resources with highest quality from each group of resources, where L is a positive integer;

selecting a specified quantity of resources with highest quality from each group of resources, where the specified quantity is different in each group of resources;

selecting a resource whose quality is higher than a second quality threshold from each group of resources;

selecting L resources with lowest quality from each group of resources, where L is a positive integer;

selecting a specified quantity of resources with lowest quality from each group of resources, where the specified quantity is different in each group of resources; or selecting a resource whose quality is lower than the second quality threshold from each group of resources.

In a possible implementation, the transceiver unit 320 is further configured to receive a value of K or a specified quantity corresponding to each of the M groups of resources from the network device.

In a possible implementation, the monitoring resources corresponding to the first measurement requirement include a CSI-RS resource and/or an SSB resource.

In a possible implementation, the monitoring resources corresponding to the first measurement requirement include a CSI-RS resource and/or an SSB resource; and the processing unit 310 is configured to:

perform, on the SSB resource in the monitoring resources corresponding to the first measurement requirement, the measurement for radio link connection quality monitoring;

perform, on the SSB resource and a part of the CSI-RS resource in the monitoring resources corresponding to the first measurement requirement, the measurement for radio link connection quality monitoring;

perform, on a part of the SSB resource in the monitoring resources corresponding to the first measurement requirement, the measurement for radio link connection quality monitoring; or perform, on a part of the CSI-RS resource in the monitoring resources corresponding to the first measurement requirement, the measurement for radio link connection quality monitoring.

In a possible implementation, the processing unit 310 is further configured to: when one or more of the following conditions are met, perform, based on the first measurement requirement, the measurement for radio link connection quality monitoring:

condition 1: second indication information sent by the network device is received, where the second indication information indicates to stop, based on the second measurement requirement, the measurement for radio link connection quality monitoring;

condition 2: a measurement process corresponding to the second measurement requirement does not meet the trigger condition;

condition 3: quality of all resources monitored in a measurement process corresponding to the second measurement requirement is lower than a third quality threshold;

condition 4: a timer expires, and the timer is started when the measurement for radio link connection quality monitoring is started to be performed based on the second measurement requirement; and condition 5: a first time period in any relaxation cycle ends, where the first time period is a time period in which the measurement for radio link connection quality monitoring is performed based on the second measurement requirement.

In a possible implementation, the transceiver unit 320 is further configured to: receive timing duration configured for the timer from the network device; or receive the relaxation cycle and the first time period from the network device.

In a possible implementation, the transceiver unit 320 is further configured to receive the first measurement requirement or the second measurement requirement sent by the network device.

It may be understood that the foregoing units may also be referred to as modules, circuits, or the like, and the foregoing units may be independently disposed, or may be partially integrated.

The transceiver unit 320 may also be referred to as a communication interface, and the processing unit 310 may also be referred to as a processor.

Optionally, the communication apparatus 300 may further include a storage unit. The storage unit is configured to store data or instructions (which may also be referred to as code or a program). The foregoing units may interact with or be coupled to the storage unit, to implement a corresponding method or function. For example, the processing unit may read the data or the instructions in the storage unit, so that the communication apparatus implements the methods in the foregoing embodiments.

FIG. 4 is a schematic diagram of a communication apparatus according to an embodiment. The apparatus is configured to implement each step performed by a corresponding network device in the foregoing method embodiment. As shown in FIG. 4, a communication apparatus 400 includes a processing unit 410 and a transceiver unit 420. The processing unit 410 is configured to generate first indication information, where the first indication information indicates a terminal device to perform, based on a second measurement requirement, measurement for radio link connection quality monitoring, and the second measurement requirement is obtained through relaxing based on a first measurement requirement; and the transceiver unit 420 is configured to send the first indication information to the terminal device.

In a possible implementation, a quantity of monitoring resources corresponding to the second measurement requirement is less than a quantity of monitoring resources corresponding to the first measurement requirement, or a measurement period corresponding to the second measurement requirement is greater than a measurement period corresponding to the first measurement requirement.

In a possible implementation, the transceiver unit 420 is further configured to send the first measurement requirement or the second measurement requirement to the terminal device.

In a possible implementation, the processing unit 410 is configured to generate the first indication information when determining that any one of the following conditions is met:

condition 1: based on mobility status information of the terminal device, it is determined that the terminal device has low mobility, and/or based on moving speed information of the terminal device, it is determined that a moving speed of the terminal device is less than or equal to a first speed threshold;

condition 2: a quality of service QoS parameter of a current service meets a threshold condition corresponding to the QoS parameter; or condition 3: a currently established data radio bearer DRB includes a DRB of a preset type.

In a possible implementation, the transceiver unit 420 is further configured to send second indication information to the terminal device, where the second indication information indicates to stop, based on the second measurement requirement, the measurement for radio link connection quality monitoring.

In a possible implementation, the processing unit 410 is further configured to generate the second indication information when determining that any one of the following conditions is met:

condition 1: based on the mobility status information of the terminal device, it is determined that the terminal device has high mobility, and/or based on the moving speed information of the terminal device, it is determined that the moving speed of the terminal device is greater than the first speed threshold; or condition 2: the quality of service QoS parameter of the current service does not meet the threshold condition corresponding to the QoS parameter.

In a possible implementation, the transceiver unit 420 is further configured to send a first quality threshold and/or a quantity threshold N to the terminal device, where N is a positive integer; and the first quality threshold and/or N are/is used to determine a preset condition, and the preset condition is used to determine, from the monitoring resources corresponding to the first measurement requirement, a resource for the measurement for radio link connection quality monitoring.

The preset condition includes any one of the following content:

a resource whose quality is higher than a first quality threshold;

N resources with highest quality;

a maximum of N resources whose quality is higher than the first quality threshold;

a resource whose quality is lower than the first quality threshold;

N resources with lowest quality; or a maximum of N resources whose quality is lower than the first quality threshold.

In a possible implementation, the transceiver unit 420 is further configured to send, to the terminal device, M groups of information corresponding to M groups of resources into which the monitoring resources are divided, and a value of K or a specified quantity corresponding to each group, where the M groups of information, the value of K, or the specified quantity corresponding to each group is used to determine a first selection manner, and the first selection manner is used to select, from the monitoring resources corresponding to the first measurement requirement, a resource for the measurement for radio link connection quality monitoring, where the first selection manner includes any one of the following content:

selecting K resources from each group of resources, where K is a positive integer;
  selecting a specified quantity of resources from each group of resources, where the specified quantity is different in each group of resources;
  selecting L resources with highest quality from each group of resources, where L is a positive integer;
  selecting a specified quantity of resources with highest quality from each group of resources, where the specified quantity is different in each group of resources;
  selecting a resource whose quality is higher than a second quality threshold from each group of resources;
  selecting L resources with lowest quality from each group of resources, where L is a positive integer;
  selecting a specified quantity of resources with lowest quality from each group of resources, where the specified quantity is different in each group of resources; or
  selecting a resource whose quality is lower than the second quality threshold from each group of resources.

In a possible implementation, the transceiver unit 420 is further configured to send, to the terminal device, timing duration configured for a timer, where the timer is started when the measurement for radio link connection quality monitoring is started to be performed based on the second measurement requirement.

In a possible implementation, the transceiver unit 420 is further configured to send a relaxation cycle and a first time period to the terminal device, where the first time period is a time period in which the measurement for radio link connection quality monitoring is performed based on the second measurement requirement in the relaxation cycle.

It may be understood that the foregoing units may also be referred to as modules, circuits, or the like, and the foregoing units may be independently disposed, or may be completely or partially integrated.

The transceiver unit 420 may also be referred to as a communication interface, and the processing unit 410 may also be referred to as a processor.

Optionally, the communication apparatus 400 may further include a storage unit. The storage unit is configured to store data or instructions (which may also be referred to as code or a program). The foregoing units may interact with or be coupled to the storage unit, to implement a corresponding method or function. For example, the processing unit may read the data or the instructions in the storage unit, so that the communication apparatus implements the methods in the foregoing embodiments.

It should be understood that division into units in the foregoing apparatus is merely logical function division. In an actual implementation, all or a part of the units may be integrated into one physical entity or may be physically separated. In addition, all the units in the apparatus may be implemented in a form in which a processing element invokes software or may be implemented in a form of hardware; or a part of the units may be implemented in a form in which a processing element invokes software, and a part of the units may be implemented in a form of hardware. For example, each unit may be a separately disposed processing element, or may be integrated into a chip of the apparatus for implementation. In addition, each unit may be stored in a memory in a form of a program and is invoked by a processing element of the apparatus to perform a function of the unit. In addition, all or a part of the units may be integrated or may be implemented independently. The processing element herein may also be referred to as a processor and may be an integrated circuit having a signal processing capability. In an implementation process, the steps in the foregoing methods or the foregoing units may be implemented by using an integrated logic circuit of hardware in the processor element or may be implemented in a form in which a processing element invokes software.

For example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, when the unit in the apparatus may be implemented in a form in which a processing element invokes a program, the processing element may be a general-purpose processor, for example, a central processing unit (CPU) or another processor that can invoke the program. For another example, the units may be integrated together and implemented in a form of a system-on-a-chip (SOC).

The foregoing unit for receiving (for example, a receiving unit) is an interface circuit of the apparatus and is configured to receive a signal from another apparatus. For example, when the apparatus is implemented by a chip, the receiving unit is an interface circuit that is of the chip and that is configured to receive a signal from another chip or apparatus. The foregoing unit for sending (for example, a sending unit) is an interface circuit of the apparatus and is configured to send a signal to another apparatus. For example, when the apparatus is implemented by a chip, the sending unit is an interface circuit that is of the chip and that is configured to send a signal to another chip or apparatus.

An embodiment may further provide a communication apparatus, and the communication apparatus may be a terminal device or a circuit. The communication apparatus may be configured to perform an action performed by the terminal device in the foregoing method embodiments.

When the communication apparatus is a terminal device, FIG. 5 is a simplified schematic diagram of a structure of the terminal device. For ease of understanding and convenience of figure illustration, an example in which the terminal device is a mobile phone is used in FIG. 5.

As shown in FIG. 5, the terminal device includes a processor, a memory, a radio frequency circuit, an antenna, and an input/output apparatus. The processor is configured to: process a communication protocol and communication data, control the terminal device, execute a software program, process data of the software program, and the like. The memory is configured to store the software program and the data. The radio frequency circuit is configured to: perform conversion between a baseband signal and a radio frequency signal and process the radio frequency signal. The antenna is configured to receive and send a radio frequency signal in a form of an electromagnetic wave. The input/output apparatus, for example, a touchscreen, a display, or a keyboard, is configured to: receive data input by a user, and output data to the user. It should be noted that some types of terminal devices may have no input/output apparatus.

When data needs to be sent, after performing baseband processing on to-be-sent data, the processor outputs a baseband signal to the radio frequency circuit; and the radio frequency circuit performs radio frequency processing on the baseband signal, and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, only one memory and one processor are shown in FIG. 5. An actual terminal device product may include one or more processors and one or more memories. The memory may also be referred to as a storage medium, a storage device, or the like. The memory may be disposed independent of the processor or may be integrated with the processor. This is not limited in this embodiment.

In this embodiment, the antenna and the radio frequency circuit that have sending and receiving functions may be considered as a transceiver unit of the terminal device (where the transceiver unit may be one functional unit, and the functional unit can implement the sending and receiving functions; or the transceiver unit may include two functional units: a receiving unit that can implement a receiving function and a sending unit that can implement a sending function), and the processor that has a processing function is considered as a processing unit of the terminal device. As shown in FIG. 5, the terminal device includes a transceiver unit 510 and a processing unit 520. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 510 and that is configured to implement a receiving function may be considered as a receiving unit, and a component that is in the transceiver unit 510 and that is configured to implement a sending function may be considered as a sending unit, that is, the transceiver unit 510 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit may also be sometimes referred to as a transmitting machine, a transmitter, a transmit circuit, or the like.

It should be understood that the transceiver unit 510 is configured to perform a sending operation and a receiving operation on a terminal device side in the foregoing method embodiments, and the processing unit 520 is configured to perform an operation other than the receiving operation and the sending operation of the terminal device in the foregoing method embodiments.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 6:
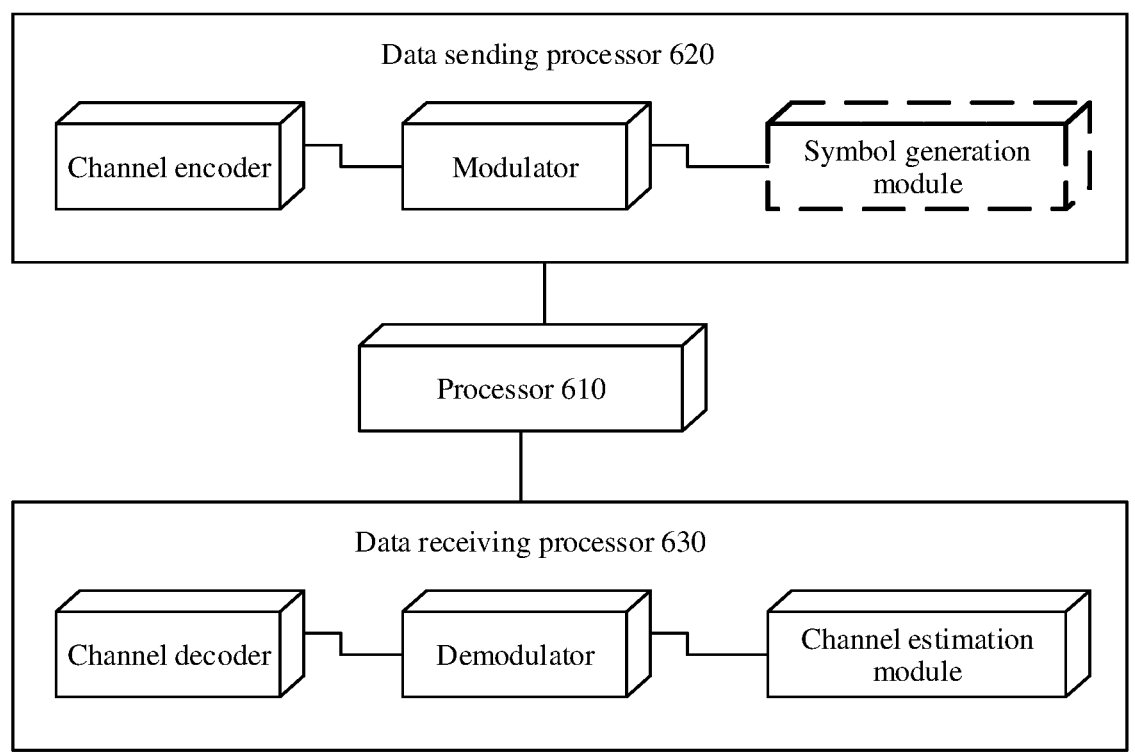
FIG. 6 is a schematic diagram of another communication apparatus according to an embodiment.

When the communication apparatus in this embodiment is a terminal device, refer to a device shown in FIG. 6.

In an example, the device may implement a function similar to a function of the processing unit 310 in FIG. 3. In FIG. 6, the device includes a processor 610, a data sending processor 620, and a data receiving processor 630. The processing unit 310 in the foregoing embodiment may be the processor 610 in FIG. 6 and completes a corresponding function. The transceiver unit 320 in the foregoing embodiment may be the data sending processor 620 and/or the data receiving processor 630 in FIG. 6 and completes a corresponding function. Although FIG. 6 shows a channel encoder and a channel decoder, it may be understood that these modules do not constitute a limitation on this embodiment and are merely examples.

Figure 7:
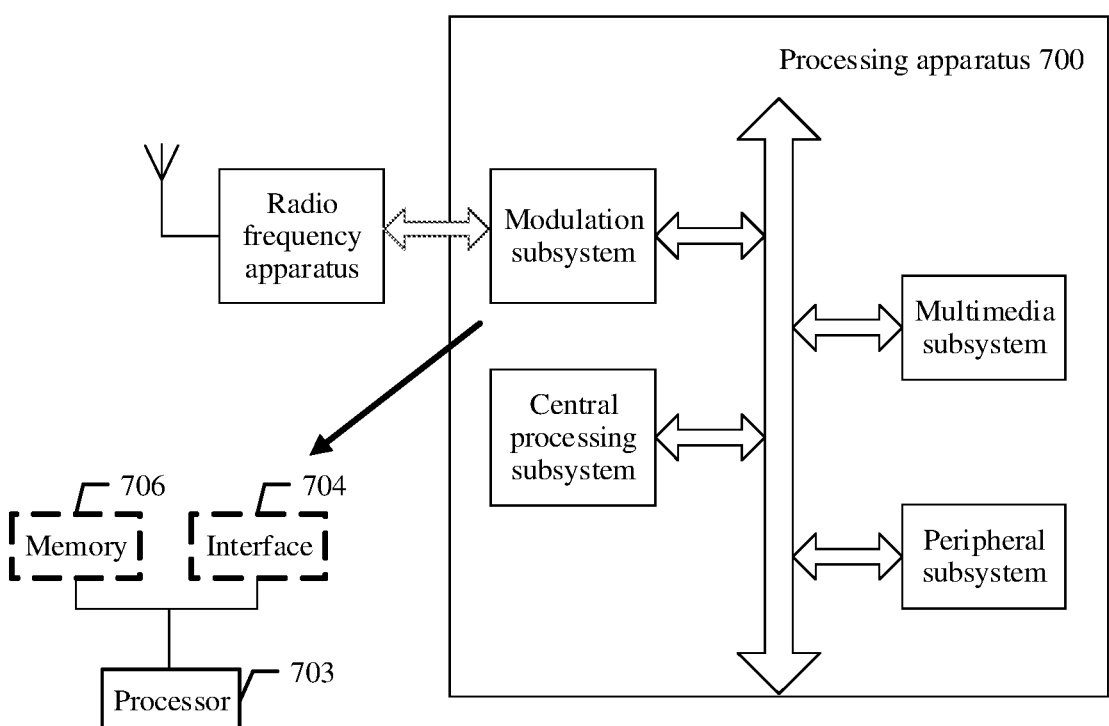
FIG. 7 is a schematic diagram of a processing apparatus according to an embodiment.

FIG. 7 shows another form of this embodiment. A processing apparatus 700 includes modules such as a modulation subsystem, a central processing subsystem, and a peripheral subsystem. The communication apparatus in this embodiment may be used as the modulation subsystem. The modulation subsystem may include a processor 703 and an interface 704. The processor 703 completes a function of the processing unit 310, and the interface 704 completes a function of the transceiver unit 320. In another variation, the modulation subsystem includes a memory 706, a processor 703, and a program that is stored in the memory 706 and that can be run on the processor. When executing the program, the processor 703 implements the method on a terminal device side in the foregoing method embodiments. It should be noted that the memory 706 may be non-volatile or volatile. The memory 706 may be located in the modulation subsystem, or may be located in the processing apparatus 700, provided that the memory 706 can be connected to the processor 703.

Figure 8:
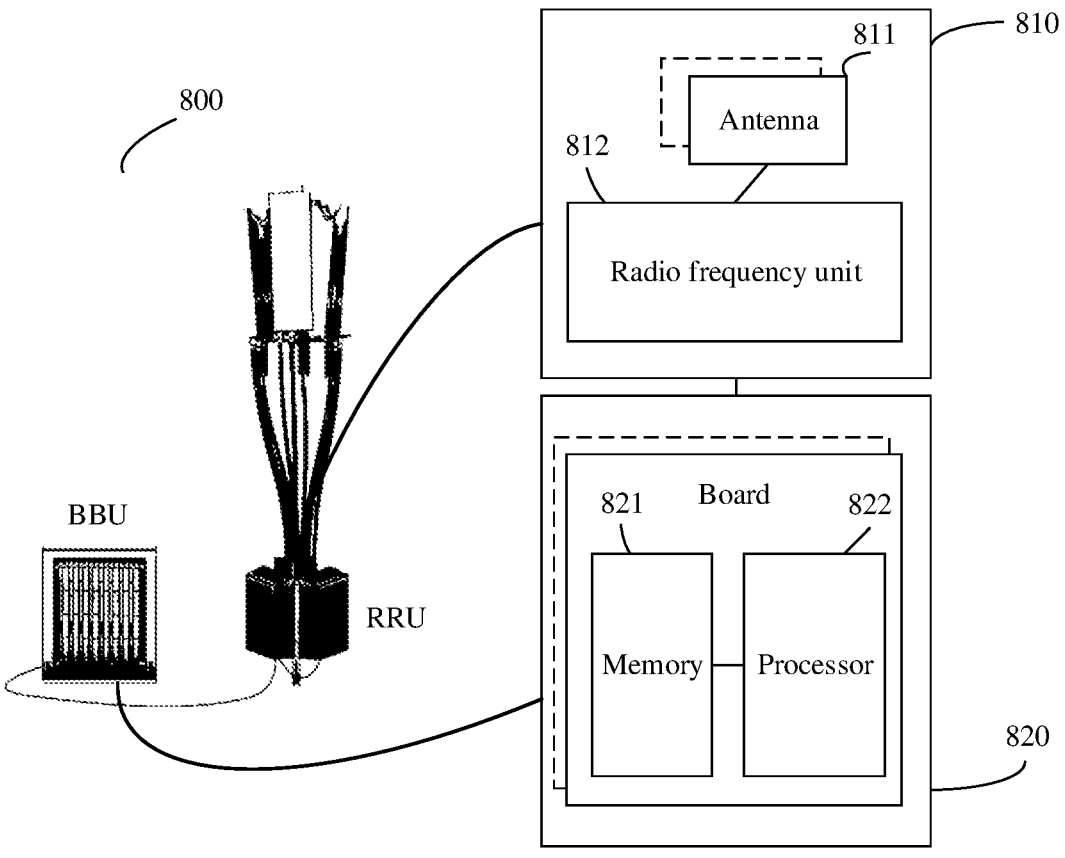
FIG. 8 is a schematic diagram of a network device according to an embodiment.

When the apparatus in this embodiment is a network device, the apparatus may be as shown in FIG. 8.

The apparatus 800 includes one or more radio frequency units, such as a remote radio unit (RRU) 810 and one or more baseband units (BBU), which may also be referred to as a digital unit (DU) 820. The RRU 810 may be referred to as a transceiver module. The transceiver module may include a sending module and a receiving module, or the transceiver module may be a module that can implement sending and receiving functions. The transceiver module may correspond to the transceiver unit 420 in FIG. 4. Optionally, the transceiver module may also be referred to as a transceiver machine, a transceiver circuit, a transceiver, or the like, and may include at least one antenna 811 and a radio frequency unit 812. The RRU 810 is configured to receive and send a radio frequency signal and perform conversion between the radio frequency signal and a baseband signal, for example, configured to send indication information to a terminal device. The BBU 820 is configured to perform baseband processing, control a base station, and the like. The RRU 810 and the BBU 820 may be physically disposed together, or may be physically disposed separately, that is, a distributed base station.

The BBU 820 is a control center of the base station, may also be referred to as a processing module, may correspond to the processing unit 410 in FIG. 4, and is configured to implement a baseband processing function such as channel coding, multiplexing, modulation, and spectrum spreading. For example, the BBU (the processing module) may be configured to control the base station to perform an operation procedure related to the network device in the foregoing method embodiment, for example, generate the foregoing indication information.

In an example, the BBU 820 may include one or more boards, and a plurality of boards may jointly support a radio access network (for example, an LTE network) in a single access standard, or may separately support radio access networks (for example, an LTE network, a 5G network, or another network) in different access standards. The BBU 820 further includes a memory 821 and a processor 822. The memory 821 is configured to store necessary instructions and data. The processor 822 is configured to control the base station to perform a necessary action, for example, is configured to control the base station to perform the operation procedure related to the network device in the foregoing method embodiment. The memory 821 and the processor 822 may serve one or more boards. In other words, the memory and the processor may be disposed on each board. Alternatively, a plurality of boards may share a same memory and a same processor. In addition, a necessary circuit may be further disposed on each board.

An embodiment may further provide a non-transitory computer-readable storage medium. The non-transitory computer-readable storage medium stores a computer program. When the computer program is executed by a computer, the computer may implement the method on the terminal device side in the foregoing method embodiment.

An embodiment may further provide a non-transitory computer-readable storage medium. The non-transitory computer-readable storage medium stores a computer program. When the computer program is executed by a computer, the computer may implement the method on the network device side in the foregoing method embodiment.

An embodiment may further provide a computer program product. The computer program product is configured to store a computer program. When the computer program is executed by a computer, the computer may implement the method on the terminal device side in the foregoing method embodiment.

An embodiment may further provide a computer program product. The computer program product is configured to store a computer program. When the computer program is executed by a computer, the computer may implement the method on the network device side in the foregoing method embodiment.

It should be understood that the processor in the embodiments may be a CPU, or may be another general-purpose processor, a digital signal processor (DSP), an application specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It may be understood that the memory mentioned in the embodiments may be a volatile memory or a non-volatile memory or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in the various embodiments. The execution sequences of the processes should be determined according to functions and internal logic of the processes and should not be construed as any limitation on the implementation processes of the embodiments.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and constraints of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments, it should be understood that the system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in the embodiments may be integrated into one processing unit, each of the functional units may exist alone physically, or two or more functional units are integrated into one unit.

When the functions are implemented in a form of a software functional unit and sold or used as an independent product, the functions may be stored in a non-transitory computer-readable storage medium. Based on such an understanding, the solutions essentially, or the part contributing to a conventional technology, or a part of the solutions may be implemented in a form of a software product. The computer software product is stored in a non-transitory storage medium and includes several instructions for instructing a computer device (which may be, for example, a personal computer, a server, or a network device) to perform all or a part of the steps of the methods described in the embodiments. The foregoing non-transitory computer-readable storage medium may be any usable medium accessible by the computer. By way of example but not limitation, the computer-readable medium may include a random access memory (RAM), a read-only memory (ROM), an electrically erasable programmable read-only memory (EEPROM), a compact disc read-only memory (CD-ROM), a universal serial bus flash disk, a removable hard disk or other optical disk storage, a disk storage medium or other disk storage, or any other medium that can be used to carry or store expected program code in a form of a command or a data structure and that can be accessed by a computer.

The foregoing description is merely an implementation, but is not intended to limit the scope of the embodiments. Any variation or replacement readily figured out by a person skilled in the art within the scope of the embodiments shall be subject to the scope of the embodiments.

What is claimed is:

1. A measurement method, comprising:

performing, based on a first measurement requirement, measurement for radio link quality monitoring;

based on mobility status information of a terminal device, determining that the terminal device has low mobility, wherein the mobility status information indicates a frequency of changing a serving cell of the terminal device; and when a trigger condition is met, performing, based on a second measurement requirement, the measurement for radio link quality monitoring, wherein the second measurement requirement is obtained through relaxing based on the first measurement requirement, wherein the trigger condition comprises:

a currently established data radio bearer (DRB) comprises a DRB of a preset type;

parameters configured for different DRBs correspond to different quality of service (QoS) requirements; and first indication information sent by a network deice is received, the first indication information indicating to perform, based on the second measurement requirement, the measurement for radio link quality monitoring.

2. The measurement method according to claim 1, wherein a quantity of monitoring resources corresponding to the second measurement requirement is less than a quantity of monitoring resources corresponding to the first measurement requirement, or a measurement period corresponding to the second measurement requirement is greater than a measurement period corresponding to the first measurement requirement.

3. The measurement method according to claim 1, wherein the trigger condition further comprises a quality of service (QoS) parameter of a current service meets a threshold condition corresponding to the QoS parameter.

4. The measurement method according to claim 3, wherein performing, based on the second measurement requirement, the measurement for radio link quality monitoring further comprises:

performing, on a resource that meets a preset condition in the monitoring resources corresponding to the first measurement requirement, the measurement for radio link quality monitoring, wherein the preset condition comprises any one of the following content:

a resource whose quality is higher than a first quality threshold;

N resources with highest quality, wherein N is a positive integer;

a maximum of N resources whose quality is higher than the first quality threshold;

a resource whose quality is lower than the first quality threshold;

N resources with lowest quality; or a maximum of N resources whose quality is lower than the first quality threshold.

5. The measurement method according to claim 4, further comprising:

receiving the first quality threshold and/or a value of N from the network device.

6. The measurement method according to claim 3, wherein the monitoring resources corresponding to the first measurement requirement are divided into M groups of resources, and further comprising:

determining a part of monitoring resources from the M groups of resources in a first selection manner; and performing, based on the second measurement requirement, the measurement for radio link quality monitoring further comprises:

performing, on the part of monitoring resources, the measurement for radio link connection quality monitoring, wherein the first selection manner comprises any one of the following content:

selecting K resources from each group of resources, wherein K is a positive integer;

selecting a specified quantity of resources from each group of resources, wherein the specified quantity is different in each group of resources;

selecting L resources with highest quality from each group of resources, wherein L is a positive integer;

selecting a specified quantity of resources with highest quality from each group of resources, wherein the specified quantity is different in each group of resources;

selecting a resource whose quality is higher than a second quality threshold from each group of resources;

selecting L resources with lowest quality from each group of resources, wherein L is a positive integer;

selecting a specified quantity of resources with lowest quality from each group of resources, wherein the specified quantity is different in each group of resources; or selecting a resource whose quality is lower than the second quality threshold from each group of resources.

7. The measurement method according to claim 6, further comprising:

receiving a value of K or a specified quantity corresponding to each of the M groups of resources from the network device.

8. The measurement method according to claim 7, wherein the monitoring resources corresponding to the first measurement requirement comprise a Channel State Information Reference Signal (CSI-RS) resource and/or a Synchronization Signal Block (SSB) resource.

9. The measurement method according to claim 3, wherein the monitoring resources corresponding to the first measurement requirement comprise a Channel State Information Reference Signal (CSI-RS) resource and/or a Synchronization Signal Block (SSB) resource; and performing, based on the second measurement requirement, the measurement for radio link quality monitoring further comprises:

performing, on the SSB resource in the monitoring resources corresponding to the first measurement requirement, the measurement for radio link quality monitoring;

performing, on the SSB resource and a part of the CSI-RS resource in the monitoring resources corresponding to the first measurement requirement, the measurement for radio link quality monitoring;

performing, on a part of the SSB resource in the monitoring resources corresponding to the first measurement requirement, the measurement for radio link quality monitoring; or performing, on a part of the CSI-RS resource in the monitoring resources corresponding to the first measurement requirement, the measurement for radio link quality monitoring.

10. The measurement method according to claim 9, further comprising:

when the following one or more conditions are met, performing, based on the first measurement requirement, the measurement for radio link quality monitoring;

condition 1: second indication information sent by the network device is received, wherein the second indication information indicates to stop, based on the second measurement requirement, the measurement for radio link quality monitoring;

condition 2: a measurement process corresponding to the second measurement requirement does not meet the trigger condition;

condition 3: quality of all resources monitored in a measurement process corresponding to the second measurement requirement is lower than a third quality threshold;

condition 4: a timer expires, and the timer is started when the measurement for radio link quality monitoring is started to be performed based on the second measurement requirement; and condition 5: a first time period in any relaxation cycle ends, wherein the first time period is a time period in which the measurement for radio link quality monitoring is performed based on the second measurement requirement.

11. A measurement method, comprising:

generating, by a network device, first indication information, wherein the first indication information indicates a terminal device to perform, based on a second measurement requirement, measurement for radio link quality monitoring, and the second measurement requirement is obtained through relaxing based on a first measurement requirement;

based on mobility status information of the terminal device, determining that the terminal device has low mobility, wherein the mobility status information indicates a frequency of changing a serving cell of the terminal device; and sending, by the network device, the first indication information to the terminal device, wherein first indication information comprises:

a currently established data radio bearer (DRB) comprises a DRB of a preset type;

parameters configured for different DRBs correspond to different quality of service (QoS) requirements; and based on moving speed information of the terminal device, determining that a moving speed of the terminal device is less than or equal to a first speed threshold.

12. The measurement method according to claim 11, wherein a quantity of monitoring resources corresponding to the second measurement requirement is less than a quantity of monitoring resources corresponding to the first measurement requirement, or a measurement period corresponding to the second measurement requirement is greater than a measurement period corresponding to the first measurement requirement.

13. The measurement method according to claim 11, further comprising:

sending, by the network device, the first measurement requirement or the second measurement requirement to the terminal device.

14. The measurement method according to claim 13, wherein generating, by the network device, the first indication information further comprises a quality of service (QoS) parameter of a current service meeting a threshold condition corresponding to the QoS parameter.

15. The measurement method according to claim 14, further comprising:

sending, by the network device, second indication information to the terminal device, wherein the second indication information indicates to stop, based on the second measurement requirement, the measurement for radio link quality monitoring.

16. The measurement method according to claim 15, further comprising:

generating, by the network device, the second indication information when determining that any one of the following conditions is met:

condition 1: based on the mobility status information of the terminal device, it is determined that the terminal device has high mobility, and/or based on the moving speed information of the terminal device, it is determined that the moving speed of the terminal device is greater than the first speed threshold; or condition 2: the QoS parameter of the current service does not meet the threshold condition corresponding to the QoS parameter.

17. The measurement method according to claim 16, further comprising:

sending, by the network device, a first quality threshold and/or a quantity threshold N to the terminal device, wherein N is a positive integer; and the first quality threshold and/or N are/is used to determine a preset condition, and the preset condition is used to determine, from the monitoring resources corresponding to the first measurement requirement, a resource for the measurement for radio link quality monitoring, wherein the preset condition comprises any one of the following content:

a resource whose quality is higher than the first quality threshold;

N resources with highest quality;

a maximum of N resources whose quality is higher than the first quality threshold;

a resource whose quality is lower than the first quality threshold;

N resources with lowest quality; or a maximum of N resources whose quality is lower than the first quality threshold.

18. The measurement method according to claim 17, further comprising:

sending, by the network device to the terminal device, M groups of information corresponding to M groups of resources into which the monitoring resources are divided, and a value of K or a specified quantity corresponding to each group, wherein the M groups of information, the value of K, or the specified quantity corresponding to each group is used to determine a first selection manner, and the first selection manner is used to select, from the monitoring resources corresponding to the first measurement requirement, a resource for the measurement for radio link quality monitoring, wherein the first selection manner comprises any one of the following content:

selecting K resources from each group of resources, wherein K is a positive integer;

selecting a specified quantity of resources from each group of resources, wherein the specified quantity is different in each group of resources;

selecting L resources with highest quality from each group of resources, wherein L is a positive integer;

selecting a specified quantity of resources with highest quality from each group of resources, wherein the specified quantity is different in each group of resources;

selecting a resource whose quality is higher than a second quality threshold from each group of resources;

selecting L resources with lowest quality from each group of resources, wherein L is a positive integer;

selecting a specified quantity of resources with lowest quality from each group of resources, wherein the specified quantity is different in each group of resources; or selecting a resource whose quality is lower than the second quality threshold from each group of resources.

19. A communication apparatus, comprising a memory, a processor and a program that is stored in the memory and that can be run on the processor, wherein when executing the program, the processor implements the method according to claim 1.

20. A communication apparatus, comprising a memory, a processor and a program that is stored in the memory and that can be run on the processor, wherein when executing the program, the processor implements the method according to claim 11.

* * * * *